United States Patent [19]

Dadpey et al.

[11] Patent Number: 4,684,868
[45] Date of Patent: Aug. 4, 1987

[54] INDUCTION MOTOR CONTROL APPARATUS AND METHOD FOR RESTART WHEN ROTATING IN SHUTDOWN

[75] Inventors: Habib Dadpey, Atlanta, Ga.; David J. Shero, South Park Township, Allegheny County, Pa.

[73] Assignee: Westinghouse Electric Corp., Pittsburgh, Pa.

[21] Appl. No.: 793,045

[22] Filed: Oct. 30, 1985

[51] Int. Cl.⁴ .............................................. H02P 5/34
[52] U.S. Cl. .................................... 318/802; 318/808; 318/812
[58] Field of Search ............... 318/779, 801, 802, 806, 318/808, 810, 811, 812

[56] References Cited

U.S. PATENT DOCUMENTS

| | | |
|---|---|---|
| 3,561,557 | 9/1971 | Magnuson et al. . |
| 3,624,476 | 12/1972 | Bruscaglioni et al. . |
| 3,787,723 | 10/1974 | Magnuson et al. . |
| 3,899,725 | 8/1975 | Plunkett .............................. 318/802 |
| 3,962,614 | 6/1976 | Rettig .................................. 318/801 |
| 4,145,618 | 8/1979 | Restori et al. . |
| 4,316,132 | 2/1982 | Geppert .......................... 318/802 X |
| 4,348,627 | 9/1982 | Fulton ............................ 318/811 X |
| 4,475,631 | 10/1984 | Nomura ......................... 318/808 X |
| 4,503,375 | 3/1985 | Okuyama ............................ 318/802 |
| 4,543,520 | 9/1985 | Danz et al. ..................... 318/811 X |
| 4,544,873 | 10/1985 | Salihi et al. ......................... 318/801 |

Primary Examiner—Patrick R. Salce
Assistant Examiner—Marc S. Hoff
Attorney, Agent, or Firm—J. L. Brzuszek

[57] ABSTRACT

AC induction motor energized by an inverter coupled with a DC power source. Upon shutdown of the inverter because of a fault condition or a rail gap between adjacent power sources, if the motor rotating frequency is greater than a minimum frequency then a decreased motor voltage is applied to the motor and increased as a ramp over a provided time delay period, after which the motor slip is controlled to provide a desired motor torque that is increased over a subsequent time delay period.

13 Claims, 39 Drawing Figures

INDUCTION MOTOR CONTROL APPARATUS AND METHOD FOR RESTART WHEN ROTATING IN SHUTDOWN

CROSS REFERENCE TO RELATED APPLICATIONS

The present application is related to the pending patent applications Ser. No. 696,833, filed Jan. 31, 1985, by D. J. Shero et al. and entitled "Induction Motor Control Apparatus And Method", Ser. No. 696,814, filed Jan. 31, 1985, by D. J. Shero et al. and entitled "Induction Motor Synthesis Control Apparatus And Method" and Ser. No. 696,832, filed Jan. 31, 1985, by H. Dadpey et al. and entitled "Torque Determination For Control of An Induction Motor Apparatus" which are assigned to the same assignee and the disclosures of which are incorporated herein by reference.

BACKGROUND OF THE INVENTION

1. Field of the Invention:

This invention relates in general to the control of an induction motor apparatus driven from a DC power source through an inverter, and more specifically to the restarting of a previously operating induction motor after an interruption of operation caused by a power discontinuity or some fault condition.

2. Description of the Prior Art:

It is known in the prior art to operate an inverter with an auxiliary energy storage circuit to sustain the inverter operation during periods of power interruption, as disclosed by U.S. Pat. No. 4,145,618.

SUMMARY OF THE INVENTION

An AC induction motor drive system using a programmed microprocessor is operated to restart the inverter after interruption of a previous motor operation by reenergizing the inverter and motor at any motor speed above a predetermined low speed such as 4 hertz, without requiring the complete stopping of the motor operation. A gradually increasing voltage is applied to the inverter and motor at a predetermined rate and at a desired synchronous frequency of the motor from a low voltage up to the required voltage level to satisfy the requested torque while using a tachometer coupled with the motor to maintain the desired frequency at the synchronous motor speed. After the voltage is ramped up to the required voltage level, the motor slip is increased to the level desired for the requested motor torque.

DESCRIPTION OF THE PREFERRED EMBODIMENT

Figure 1:
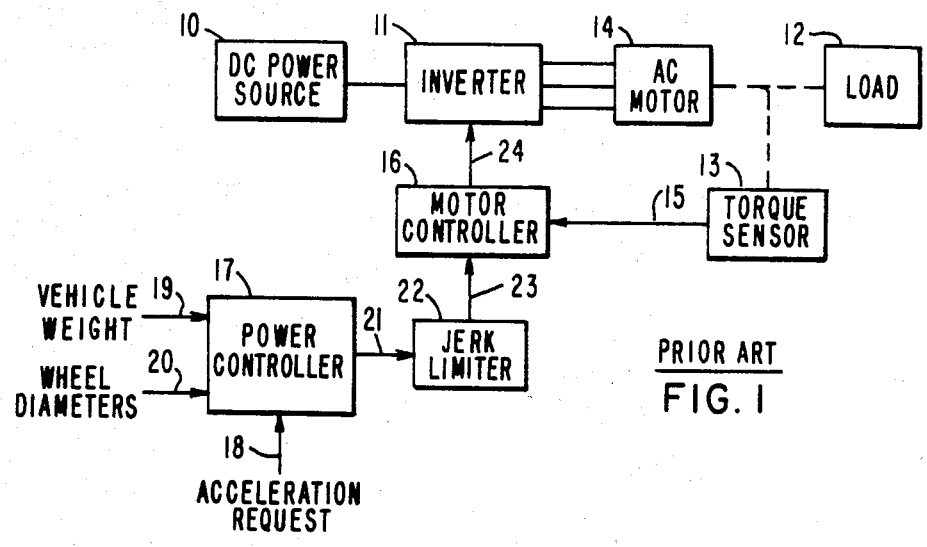
FIG. 1 shows a prior art AC induction motor control apparatus.

In FIG. 1 there is shown a prior art AC induction motor control apparatus including a DC power source 10 coupled with an inverter 11 for determining the operation of a three-phase AC induction motor 14 connected with a load 12, which could represent a transit vehicle. A torque sensor 13 is coupled with the motor 14 to provide a torque feedback 15 to a motor controller 16. A power controller 17 receives as inputs an acceleration request 18, which could be from the transit vehicle operator, the transit vehicle weight 19, and the transit vehicle wheel diameters 20. The power controller 17 produces a torque effort request 21, which represents the torque to be achieved by the AC motor 14 in order to accelerate the load 12, at the rate defined by acceleration request 18. A jerk limiter 22 takes the torque effort request 21 and jerk limits it to provide a jerk limited torque effort request 23 to the motor controller 16. The motor controller 16 produces GTO pole switch firing pulses 24 for the inverter 11, in order to match the torque feedback 15 to the torque effort request 23.

Figure 2:
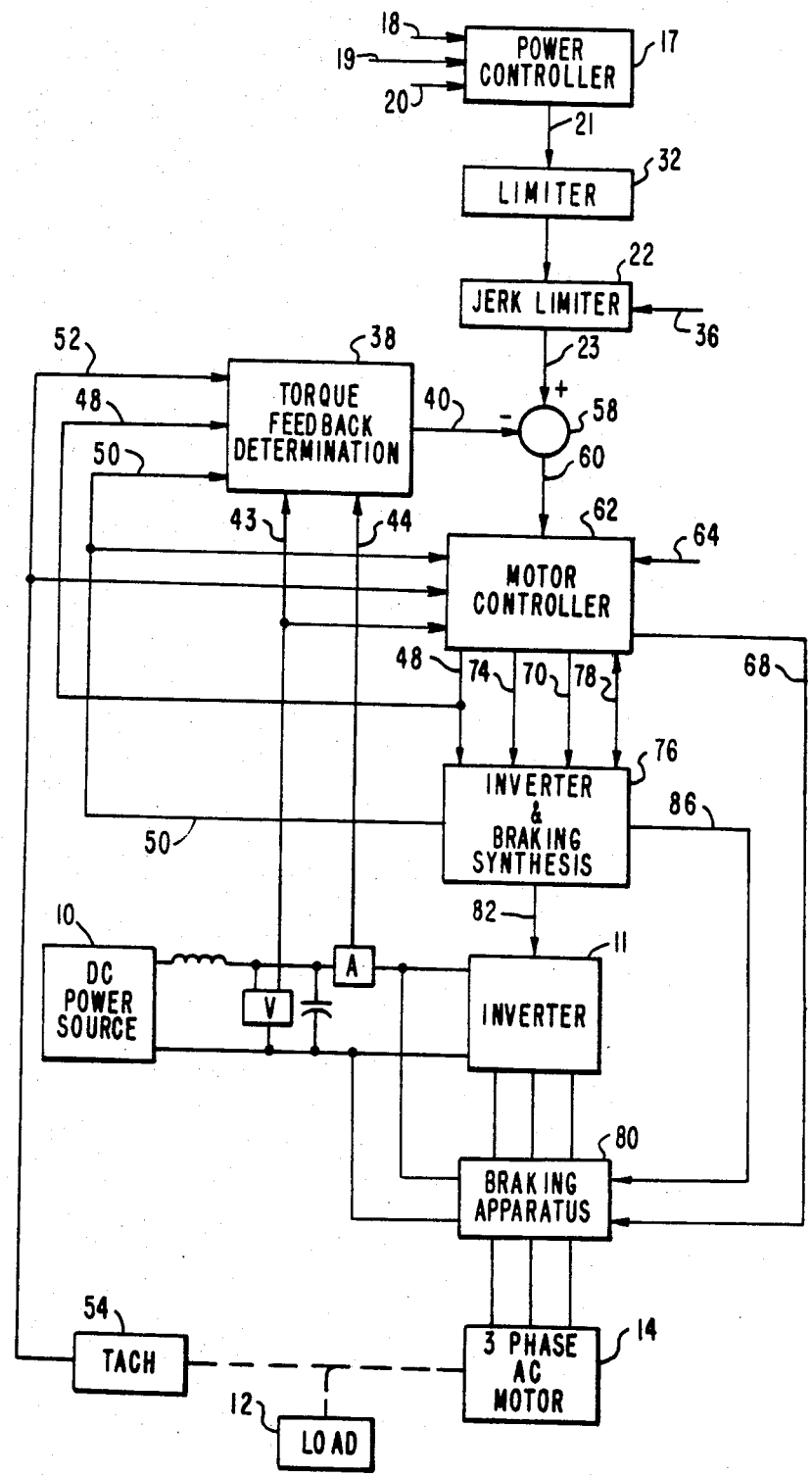
FIG. 2 shows a block diagram of the present AC induction motor control apparatus.

In FIG. 2 there is shown an induction motor control apparatus for operation to control a three phase AC motor, such as the propulsion motor of a mass transit passenger vehicle. The vehicle operator can provide a power controller 17 with a vehicle acceleration request 18 which, by taking into account the vehicle weight 19 and vehicle wheel diameters 20, the power controller 17 translates into a torque effort request signal 21 which is input to a signal limiter 32 for preventing unreasonable torque effort requests. A jerk limiter 22 is provided in relation to a desired jerk rate 36 for establishing a jerk limited torque request 23 for the comfort of the vehicle passengers. A torque feedback determination apparatus 38 determines the torque feedback 40 by measuring the system input power in relation to the DC voltage 43 and DC current 44 provided by a power supply 10 and in relation to the inverter frequency 48 and the synthesis mode 50 and the tachometer speed 52 provided by a tachometer 54 coupled with the propulsion motor 14 to estimate the output torque of the motor 14. The torque feedback signal 40 is supplied to the negative input of a summing junction 58 for comparison with the jerk limited torque request signal 23 supplied to the positive input of the summing junction 58. The resulting torque error signal 60 is supplied to a motor controller 62. A car control enable signal 64 from the operator permits the propulsion motor 14 to run or not. Other needed inputs by the motor controller 62 consist of the DC line voltage 43 and the synthesis mode of the inverter 50. The motor controller 62 outputs the braking thyristors enable 68, the requested braking angle 70, the requested inverter frequency 48, and the requested inverter voltage percent 74 to the inverter and braking synthesis apparatus 76, which in addition has as an input and output control state signal 78 and provides the synthesis mode signal 50 to the motor controller 62 and to the torque feedback determination apparatus 38. When the motor 14 is in brake operation, with additional voltage supplied by the transformer braking circuit 80, the control state signal 78 operates to keep the synthesis mode in six-step and prevents a change to the quasi six-step or PWM modes. The inverter and braking synthesis apparatus 76 outputs the inverter GTO firing pulses 82 to the inverter 11 and the brake GTO firing pulses 86 to the braking circuit 80. The inverter 11 drives the motor 14 in power and in brake operation and the braking circuit 80 operates with the motor 14 when additional braking torque is desired above base speed operation.

Figure 3:
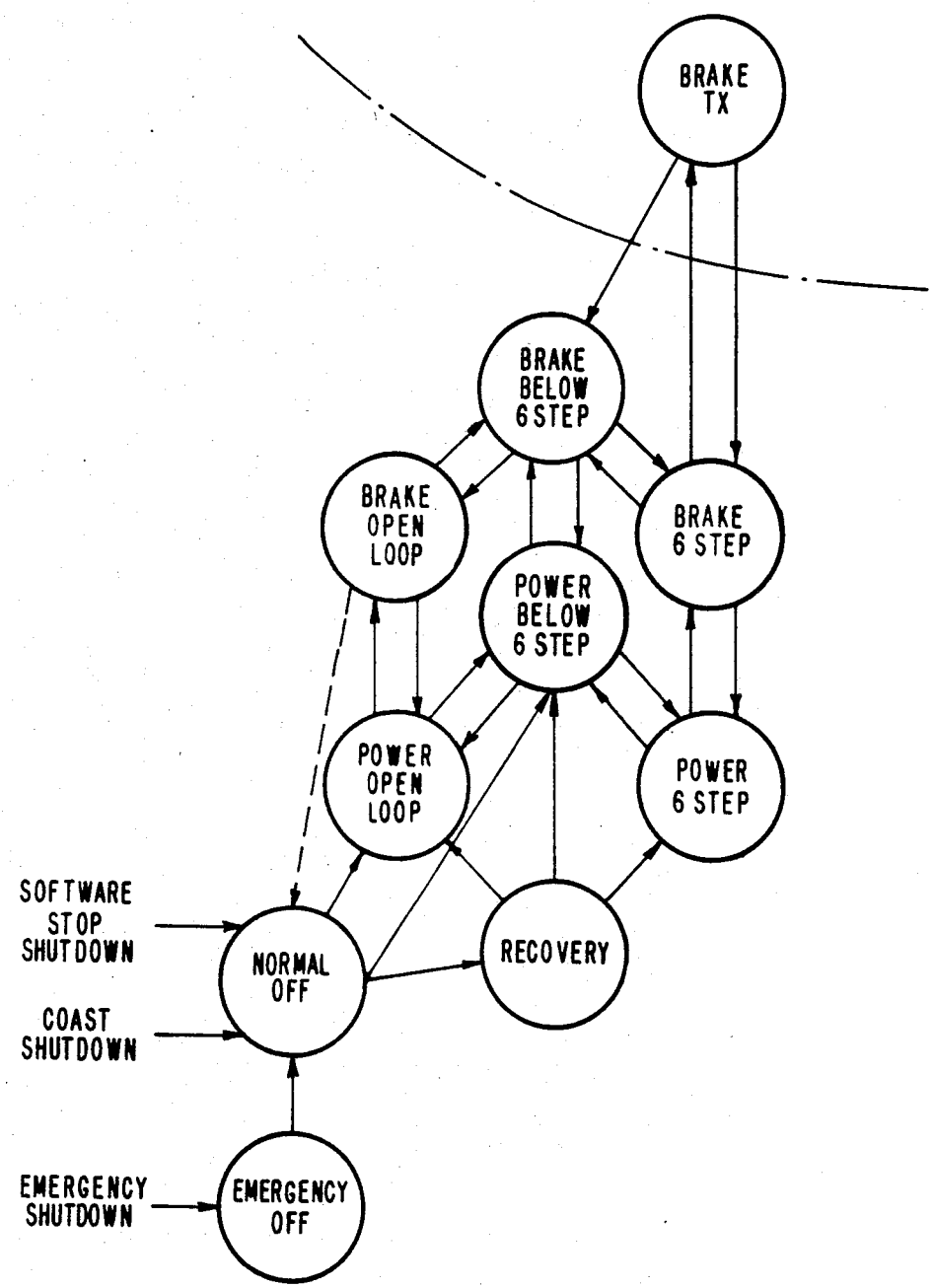
FIG. 3 shows the control states of the present AC motor control apparatus shown in FIG. 2.

In FIG. 3 there is shown the control states of the present AC motor control apparatus.

The operation of the present control apparatus can be divided into the three basic states: off, power, or brake. The off state can be further divided into normal or emergency off states, which both indicate that the system is not operational. A normal off condition results from a command by the vehicle control input, such as from the operator's master controller. An emergency off condition results from a system shutdown as a result of an unacceptable condition such as overcurrent or low line voltage.

The power state is divided into the two regions of below or above base speed. The distinction is made because below base speed the motor is essentially operated under constant volts per hertz condition resulting in maintaining a desired air gap flux density, whereas in the above base speed range the inverter is operated in the six-step mode to give the maximum obtainable output torque from the motor and the air gap flux density is decreased as a result of increased speed. Above base speed operation is similar to the field weakening region in DC propulsion equipment.

The brake state comprises the same two basic divisions as the power state of below and above base speed. The below base speed region is also similar to the power case since the inverter is capable of providing the demanded torque by itself. The brake above base speed is more complicated since the inverter cannot generate the required torque alone and the regeneration braking circuit must be used. The brake above base speed region is further divided into three separate sections:

(A) brake above base speed and below rated slip;
(B) brake above base speed at rated slip with regeneration circuit not at max capability;
(C) brake above base speed with regeneration circuit at max capability and slip at more than rated slip.

The transitions between these control states are made through special transition routines which define the possible control states that can be entered based on the present control state and the existing conditions such that a transition can be made from power above base speed to brake above base speed and below rated slip A, but not to the other two brake above base speed conditions B or C.

The basic control philosophy is one of slip control, that is, the slip of the motor is adjusted by varying the operating frequency of the inverter in order to achieve the desired torque output. During the operation in the below base speed region, the motor is kept in the rated volts per hertz operation, resulting in rated air gap flux density. Whereas above base speed, the inverter is at maximum voltage output. In this mode of operation inverter voltage cannot be manipulated to obtain rated air gap flux density.

If a motor is in a braking state above base speed, it is desirable to obtain more braking torque than can be achieved by adjusting slip at the maximum voltage output. It is not possible to get the required braking rate without somehow increasing the motor voltage. A special transformer circuit is used to provide the extra voltage needed by the motor. When braking the motor above base speed, the slip of the motor is manipulated to arrive at the desired torque. If by the time slip reaches the rated value and the desired torque is not reached, then the slip is held at that value and the transformer voltage controller is released to increase the voltage on the motor for increasing the torque output in brake until the maximum angle is reached at about 80°. Then the transformer controller is locked at this position and the slip controller is released allowing the slip to increase above its rated value up to an absolute maximum slip in order to satisfy the torque request. This strategy is provided to keep the currents in the GTOs under a preset limit of 350 amps RMS in order to avoid shutdowns due to overcurrent conditions while providing the torque needed to satisfy the torque request.

The control operation is initialized at the control state of emergency off, such that the start-up or power-up operation is emergency off. From emergency off, the only other next state is normal off, and the operator car controller allows that transition. Once in normal off and the car controller requests go, a jump can be made to either the recovery state, to the power open loop state, or to the power below six-step state. While in the emergency off state, a check is made to see if the recovery timer is timed out, which is a timer provided to keep the control state in emergency off for a predetermined time period. Then a change of the control state to normal off and then to either power below six-step, power open loop, or recovery is made depending upon operating conditions. Once the inverter is running then the determine mode routine is executed to see if it is desired to change to another state. For example, if the control was in power below six-step and a brake request is received, a change would be made to brake below six-step, and the operation is going to change from power to brake. Most of the paths indicated in FIG. 3 are determined in the determine mode routine with the exception of the changes between six-step and below six-step which are in the synthesis transition. The other paths are done under the determine mode routine. For example, if the present control state is power below six-step, the determine mode routine will check the conditions to go either to power open loop, or to go to brake below six-step and those are the only choices available. The synthesis will check the conditions to go to power six-step.

Figure 4:
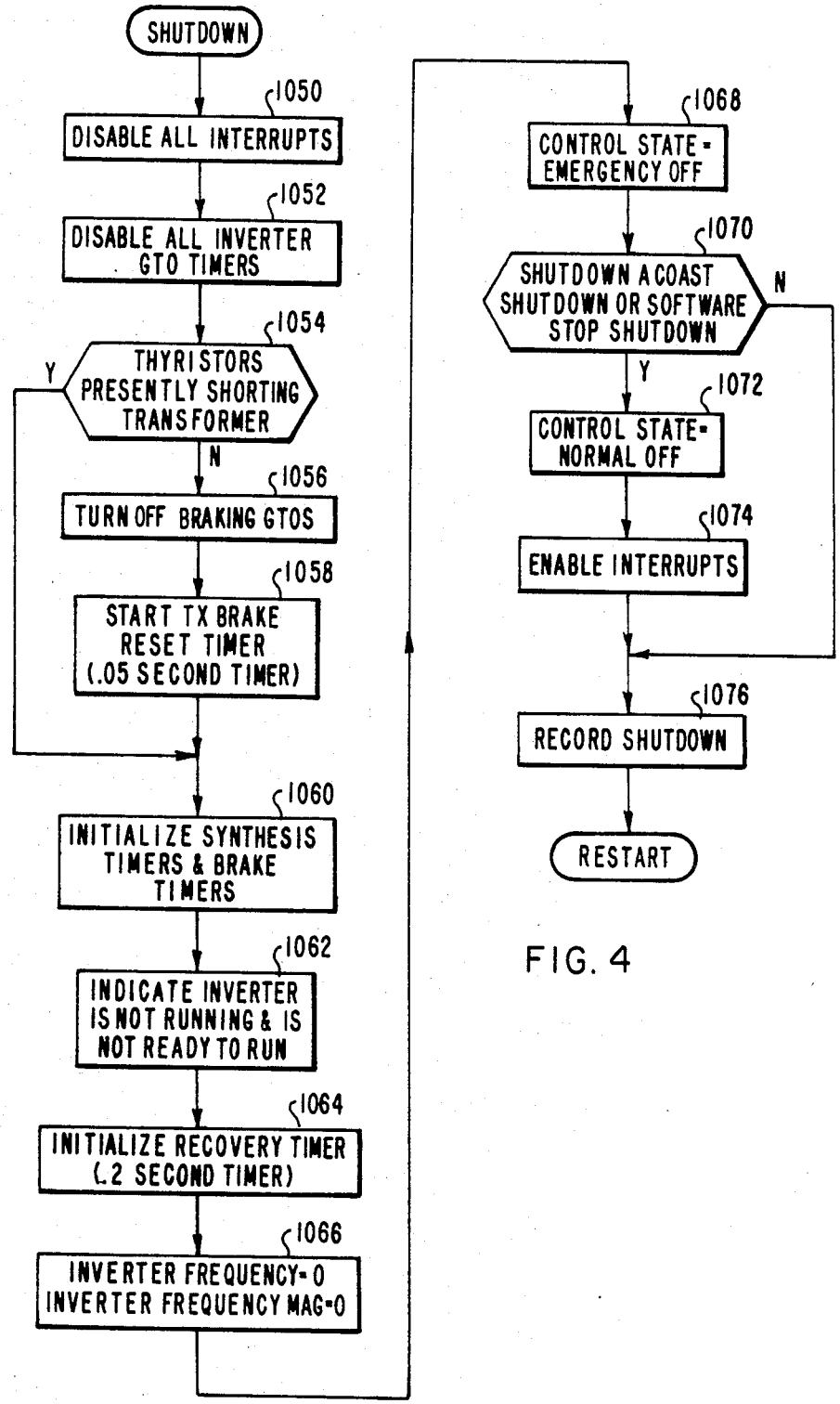
FIG. 4 shows a flow chart for the shutdown routine.

In FIG. 4 there is shown a flow chart for the shut-down or error procedure routine. At block 1050, all interrupts are disabled. In block 1052 all of the inverter GTO timers are disabled and this is going to turn off all of the GTOs in the inverter. In block 1054, a check is made to see if the thyristors are presently shorting the braking transformer. If they are not, then a couple of intermediate steps are required, since it is desired to bring back in the thyristors to start shorting the transformer but it is not done all at once. At block 1056, the braking GTOs are turned off while the thyristors are still off. The objective is to eventually turn the thyristors on and turn the braking GTOs off. At block 1058, the TX brake reset timer is started, which is a 0.05 second timer which is just a delay. Once this timer times out, there is another routine in FIG. 6 in the start-up that will turn on the thyristors and turn off the braking GTOs, to provide a normal condition for starting up in power. Block 1060 initializes the synthesis timers and the brake timers. When it is desired to start again, the timers are ready. At block 1062, the inverter is indicated as not running and is not ready to run because it is necessary to initialize the values which is done in the restart routine shown in FIG. 5. Block 1064 initializes the recovery timer, which is a 0.2 second timer and this provides, after the inverter is shutdown during an emergency situation, a wait of 0.2 seconds or a certain amount of time for the currents to die out. Block 1066 sets the inverter frequency equal to zero and inverter frequency magnitude equal to zero. The inverter frequency is a signed number and the magnitude is the absolute value of it. Block 1068 sets the control state equal to emergency off. Block 1070 checks to see if the shutdown is a coast shutdown or a software stop shutdown. If it is either one of those, then block 1072 sets the control state equal to normal off and block 1074 enables the interrupts. If not, one of the shutdowns is checked at block 1070, then the control state is kept at emergency off, and block 1076 records the shutdown. Then a branch is made to the restart routine shown in FIG. 5.

Figure 5:
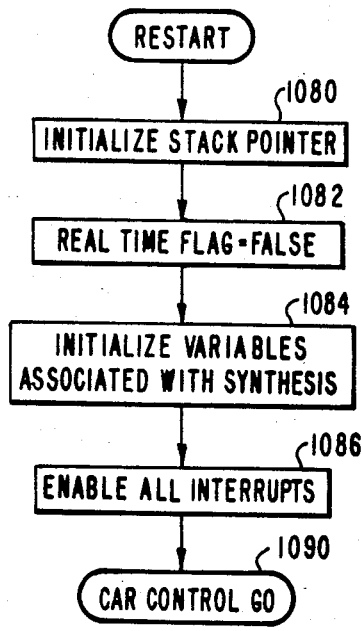
FIG. 5 shows a flow chart for the restart routine.

In FIG. 5 there is shown a flow chart for the restart routine called by the shutdown routine shown in FIG. 4. In the restart routine at block 1080 the stack pointer is initialized. At block 1082 the real time flag is set equal to false in the event there was an interrupt while doing the real time routines. At block 1084 the variables associated with the synthesis operation are initialized. At block 1086 all interrupts are enabled. At label 1090, the program goes to block 208 of the start routine shown in FIG. 6.

Figure 6:
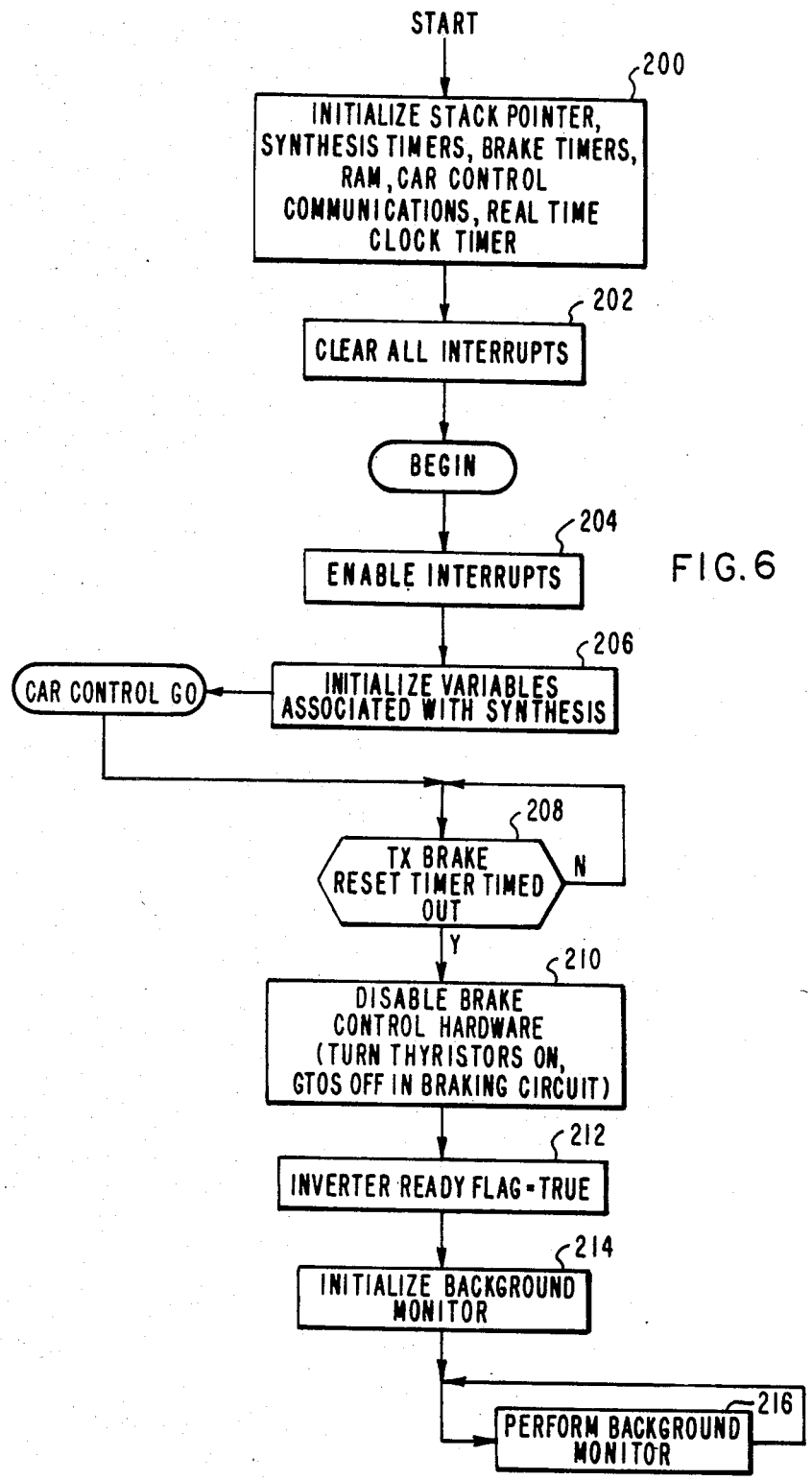
FIG. 6 shows a flow chart for the main start-up and the start-up after a fault condition routine.

In FIG. 6, there is shown the power-up or start routine. When the processor powers up, a jump is made to this location. In block 200, the stack pointer is initialized for all of the stack functions. The synthesis timers and the brake timers are set in the OFF state. The RAM memory is initialized as well as the car control communications for communication with the car control. A real time clock timer is initialized to the right frequency of 720 Hz. Block 202 clears all of the interrupts. The program then enables all interrupts at block 204. The only interrupts that should be present are from the real time clock. Block 206 initializes all variables associated with the synthesis operation. Every time the control pulse synthesis operation starts or restarts, it is necessary to initialize the associated variables.

A check is made at block 208 to see if the transformer brake reset timer is timed out. When the transformer braking operation is shut down for a fault condition, it is shut down to one state and after a certain time it is changed to another state, and there is a timer provided between those two states to control the change to the final state. If this timer is not timed out, the program waits at block 208 for the timer to time out. At block 210, the brake control hardware is disabled as the second state of the brake control shutdown, and this involves turning the thyristors ON and the GTO switches are turned OFF in the braking circuit. At block 212, the inverter ready flag is set equal to true to tell the main control loop that the processor is ready to do the synthesis operation. The real time interrupts are looking at this flag, and until this flag is set equal to true the program does not proceed to operate the motor. The background monitor is initialized at block 214 to operate with a video display to show what is going on. At block 216 the background monitor is operated to provide desired testing for development and related purposes to display diagnostic type information. Real time interrupts occur while in this background monitor loop. The actual motor controller 62 functions are performed during these real time interrupts. The inverter and braking synthesis 76 is performed by the microprocessor during interrupts from the synthesis timers which can occur whenever the microprocessor is either in the background monitor loop or the real time interrupt calculations. After performing the instructions in an interrupt procedure, the microprocessor returns to the routine it was performing when the interrupt occurred. The flow chart in FIG. 6 shows the main start-up loop program and also the start-up after a fault condition.

Figure 7A:
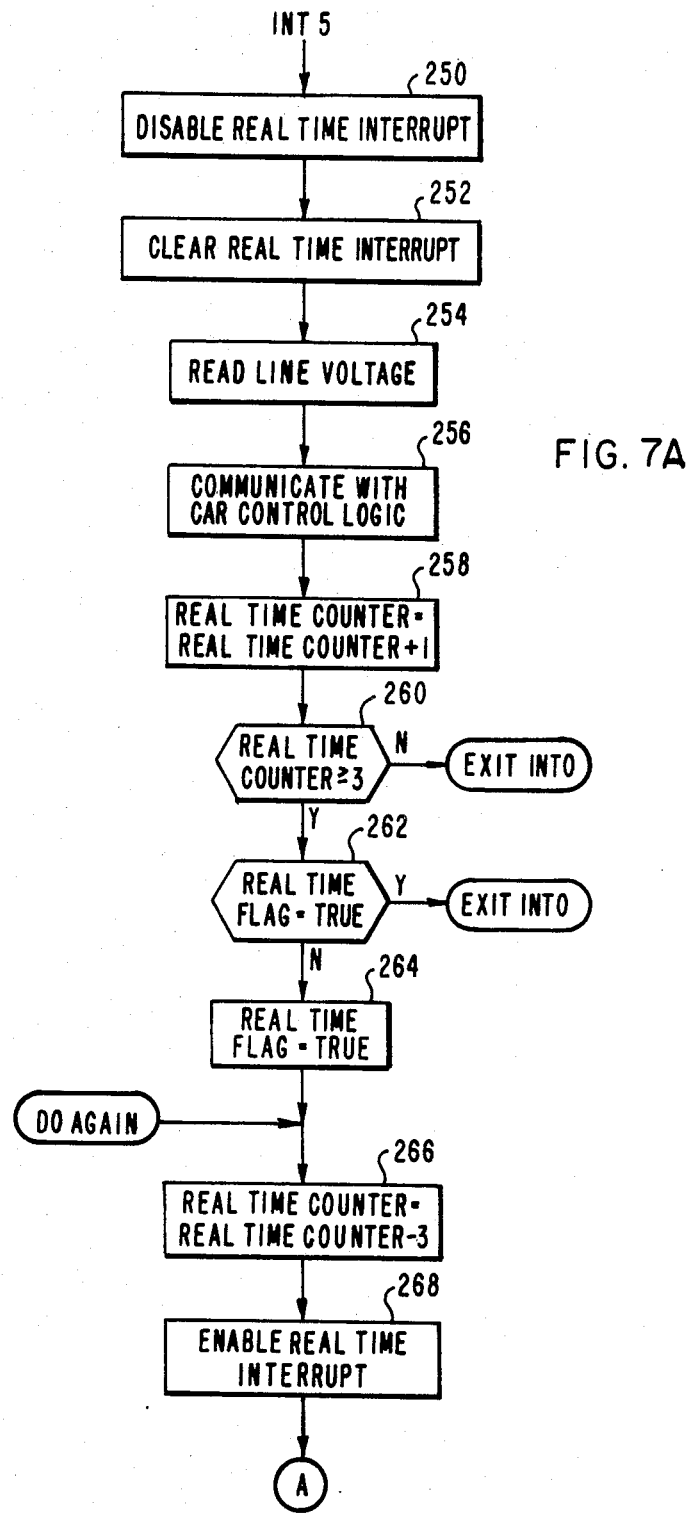
FIGS. 7A and 7B show a flow chart of the main interrupt routine.
Figure 7B:
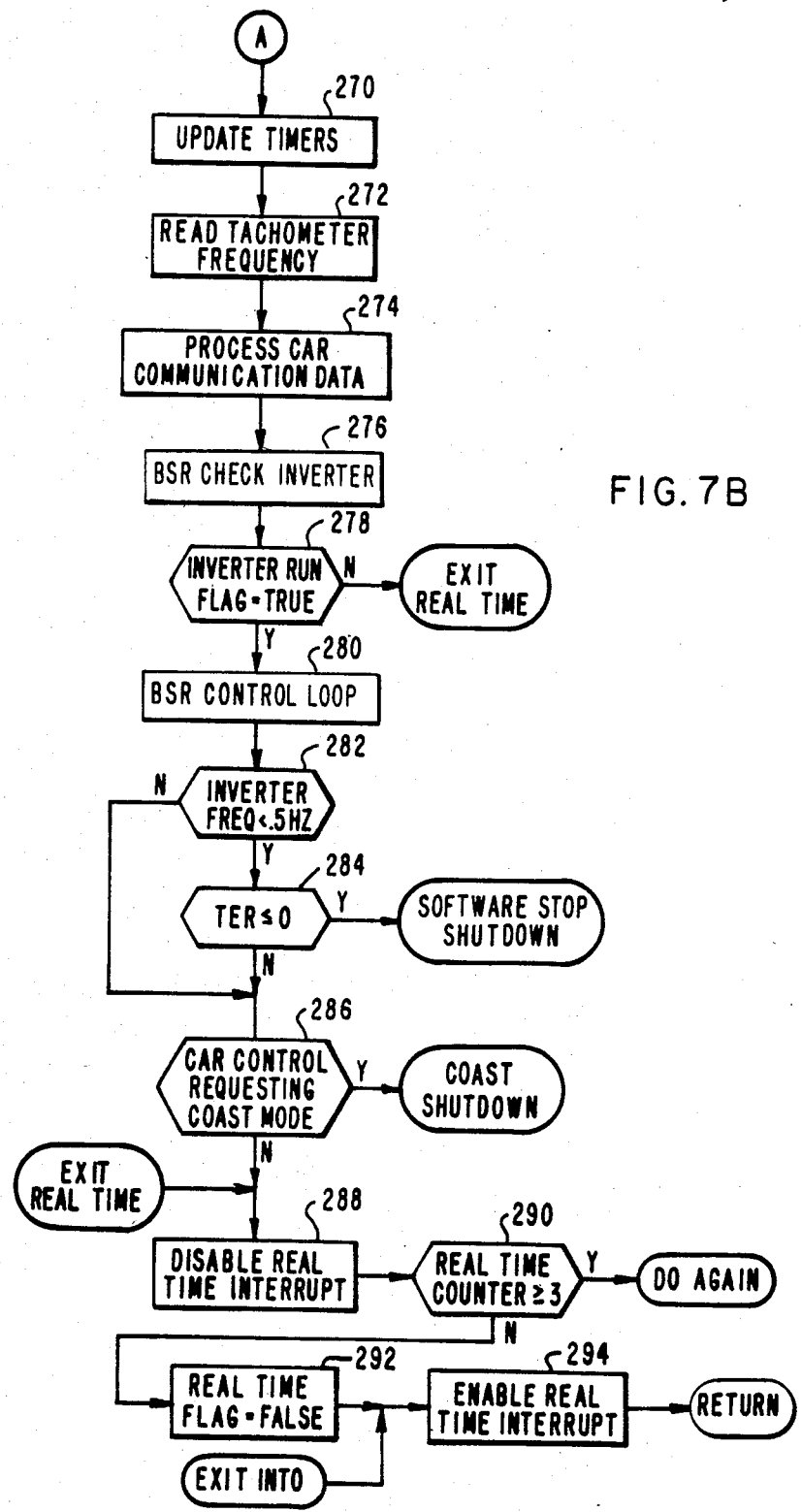

The flow chart in FIGS. 7A and 7B shows the interrupt program to which the operation jumps upon receiving a real time interrupt. Once an interrupt is received, the first thing at block 250 is to disable the real time interrupt. Block 252 clears the real time interrupt to acknowledge receipt of the interrupt. At block 254 the line voltage is read. A serial communications link can be provided with the power controller 17 so this serial information is obtained at a 720 Hz rate, and at block 256 new pieces of information are obtained and they are stored until the whole block of information is obtained.

There is an interrupt available for the real time clock set at a 720 Hz rate, but it is not desired to do everything at that high rate. The real time counter is incremented every time at block 258 when an interrupt is received, and once that real time counter is greater than or equal to three at block 260, the slower type of control is performed at a 240 Hz rate.

At block 262 a check is made to see if the real time flag equals true. If this flag equals true, the program was already in the process of performing the 240 Hz calculations when the 720 Hz real time interrupt occurred. It is not desirable for the 240 Hz calculations to be started again until the last set of calculations is complete. This flag is set at the beginning of the 240 Hz calculations and reset at the end in order to prevent a second set of 240 Hz calculations being started prior to the completion of the current 240 Hz calculations. If this real time flag is set to true, no new 240 Hz calculations will be started, and a jump to EXIT INTO at the end of this routine is performed. If this flag is not equal to true, a 240 Hz calculation set can be started. At block 264, the real time flag is set to true to disable the starting of a new 240 Hz calculation set until this set is complete and the real time flag is reset back to false. At block 266 three is subtracted from the real time counter. The blocks 258, 260, 262, 264 and 266 permit operation at a 240 Hz effective interrupt rate. At block 268 the real time interrupt is again enabled such that during the 240 Hz set of calculations additional 720 Hz real time interrupts can be processed. Continuing in FIG. 7B, at block 270 there is an update of the timers used in all routines of the program to add 1/240 of a second to each of the timers. For a 1 second timer this routine would run 240 times for that timer to finally expire. At block 272 the tachometer frequency is read. If the communication at block 256 with the car control logic has provided a whole block of information, then at block 274, the commands from the power controller 17 are processed, such as the desired tractive effort wanted from the motors and the desired direction of forward or reverse. At block 276, a branch is made to a subroutine called Check Inverter shown in FIG. 8, which checks to see whether the inverter wants to be run or is running. In block 276 as well as throughout the flowcharts, the abbreviation BSR is used to indicate a branch to subroutine. The name of the subroutine to be branched follows the BSR initials. When a branch to subroutine, also referred to as a subroutine call, is encountered, the program execution jumps to that subroutine and the instructions of that subroutine are executed. At the end of the subroutine is a return statement that causes the program execution to be transferred back to the routine that contains the subroutine call; and execution resumes with the first instruction after that call instruction. At block 278, the inverter run flag is checked to see if it equals true, and if not a real time exit is made to a later part of the program. If this flag is true, at block 280 a branch is made to a control loop routine shown in FIG. 15 which is the actual control program. At block 282, a check is made to see if the inverter frequency is less than 0.5 Hz and at block 284 a check is made to see if the power controller 17 is requesting a tractive effort less than or equal to zero. If the answer is yes, the motor is almost stopped and there is no request to go into power, so a software stop shutdown is provided by the shutdown routine shown in FIG. 4 that actually shuts down the inverter, the braking circuit, and reinitializes all the variables, and then returns back to the power up routine in FIG. 6 at the car control GO label. In block 286, a check is made to see if the car control or power controller 17 is requesting a coast mode. When the car control requests a coast mode, the inverter is shut down and the car coasts and the program goes to a coast shutdown routine. The exit real time label from block 278 is provided here. At block 288, this is close to the end of the real time interrupt, so the real time interrupt is now disabled to permit a check of the real time counter at block 290, without the 720 Hz routine providing an interrupt at the same time. If that real time counter is still greater than or equal to 3, indicating that it got incremented before the program could get through this routine, the program goes back to block 266 to repeat the 240 Hz calculation portion of the routine until the real time counter is less than 3. Eventually, it will get to be less than 3. At block 292, the real time flag is set equal to false so future 240 Hz calculation sets can be performed. Block 294 reenables the real time interrupts and a return is made to the perform background monitor block 216 of FIG. 6.

Figure 8:
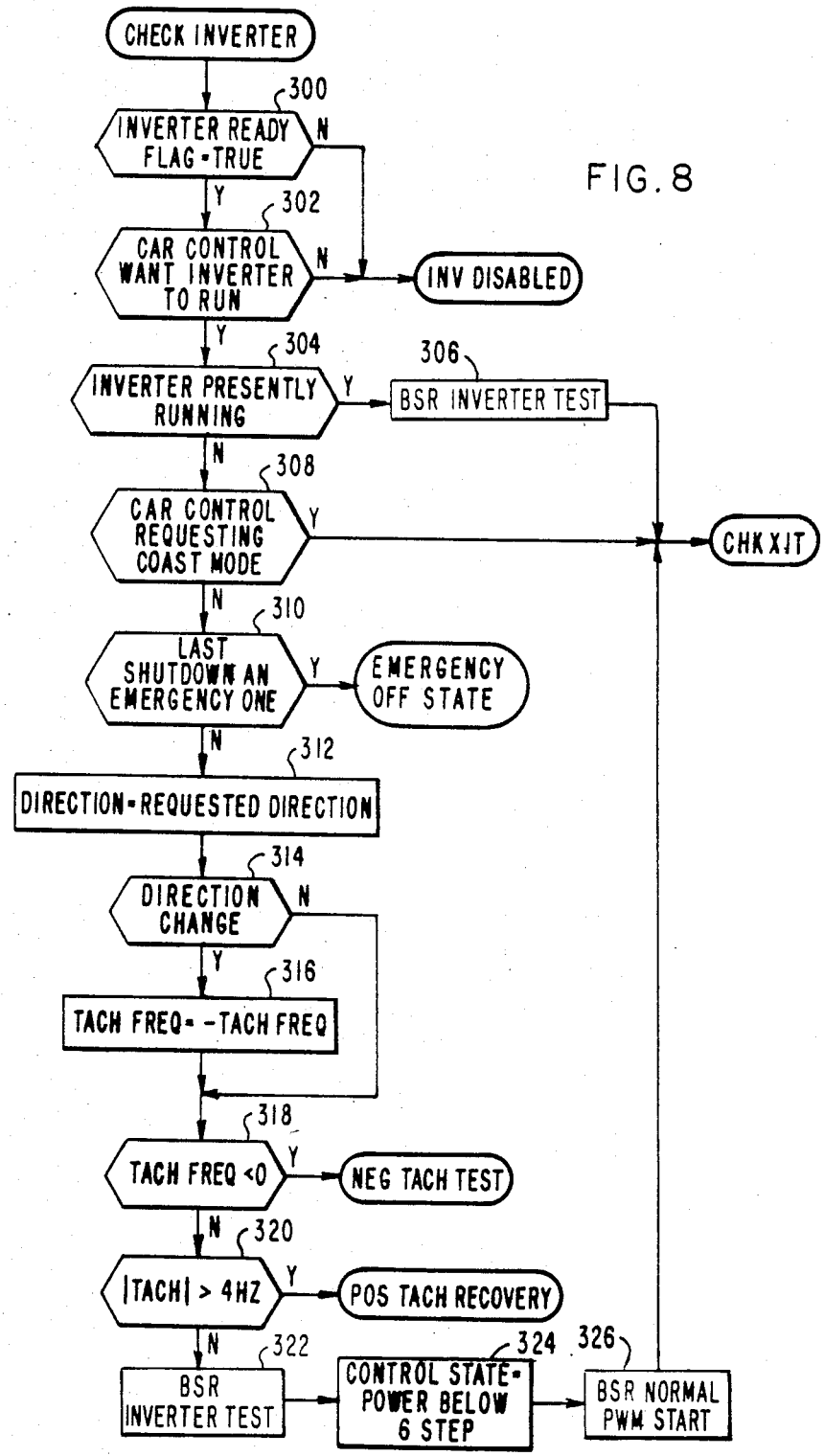
FIG. 8 shows a flow chart of the check inverter routine.
Figure 11:
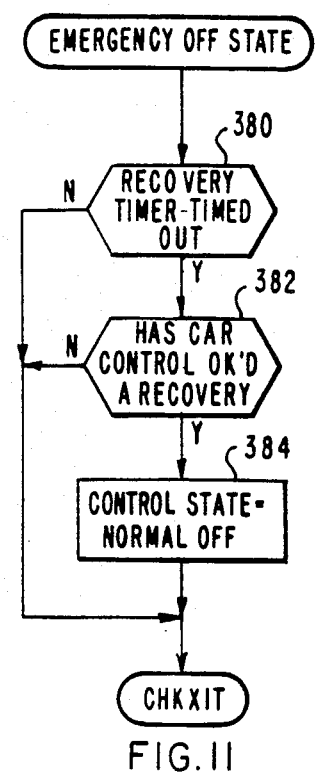
FIG. 11 shows a flow chart of the emergency off state routine.

In block 276 a branch is made to a check inverter subroutine shown in FIG. 8. Block 300 makes a check to see if the inverter ready flag is equal to true. During the power up routine, when the processor is ready to go, this flag is set equal to true. If this flag is not equal to true, then a jump is made to a label called INV DISABLED, shown in FIG. 12, which prevents the inverter start-up. If this flag is true, a check is made at block 302 to see if the car control wants the inverter to run, and if not a jump is made to the INV DISABLED label. If it does, at block 304 a check is made to see if the inverter is presently running. If it is presently running, the program goes to block 306 to an inverter test subroutine shown in FIG. 13 to make a desired test, and then it branches to CHKXIT to exit from the routine. If the inverter is not presently running, a check is made at block 308 to see if the car control is requesting COAST MODE. If the car control is requesting COAST MODE, then there is no need to restart the inverter until that COAST MODE request disappears and the routine exits. If it is not requesting COAST MODE, at block 310 a check is made to see if the current control state is EMERGENCY OFF. If so, a fault condition such as a current overload caused the last shutdown and the car control must okay a restart before the inverter can be started again. If the control state is EMERGENCY OFF, a jump to the emergency off state routine of FIG. 11 is performed. If the control state is not set to EMERGENCY OFF, it must be set to NORMAL OFF and block 312 will be executed. At block 312 the direction is set equal to the requested direction which comes from the car control. At block 314 a check is made to see if a direction change has occurred. If a direction change is made from forward to reverse, or from reverse to forward, at block 316 the tach frequency is set equal to the minus tach frequency, since for a change of direction the tach reading is actually the negative tach because it is desired to go in the opposite direction.

At block 318 a check is made to see if the tach frequency is less than zero. If the tach frequency is less than zero, that means the train is rolling backwards, and the program goes to the negative tach test routine shown in FIG. 9. If not, at block 320 a check is made to see if the absolute value of the tach is greater than 4 Hz. If it is greater than 4 Hz, then a recovery procedure is needed to avoid voltage transients. If the tach is less than 4 Hz, at block 322, a branch is made to an inverter test subroutine shown in FIG. 13, which basically checks whether the line voltage is within desired limits for the inverter to run. At block 324, the control state is set equal to power below six-step. At block 326, a branch is made to a subroutine shown in FIG. 26 providing a normal PWM start of the synthesis operation and then a jump is made to check exit which is the end of this routine.

Figure 9:
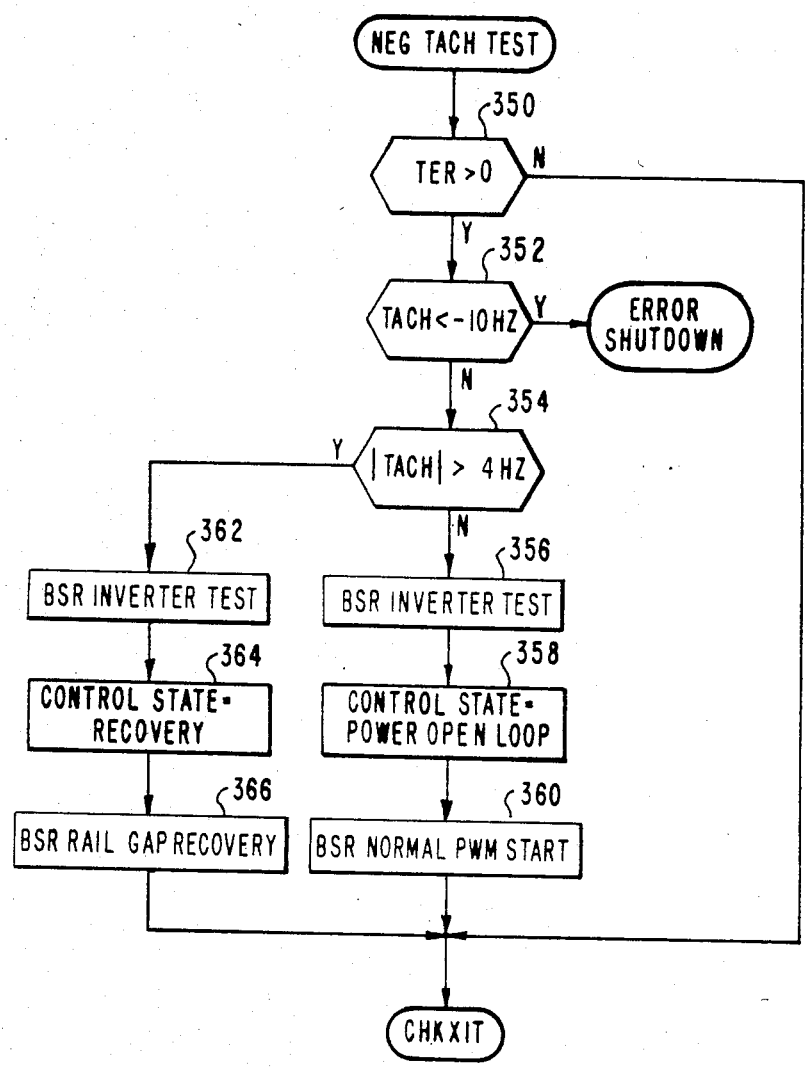
FIG. 9 shows a flow chart of the negative tach test routine.
Figure 28:
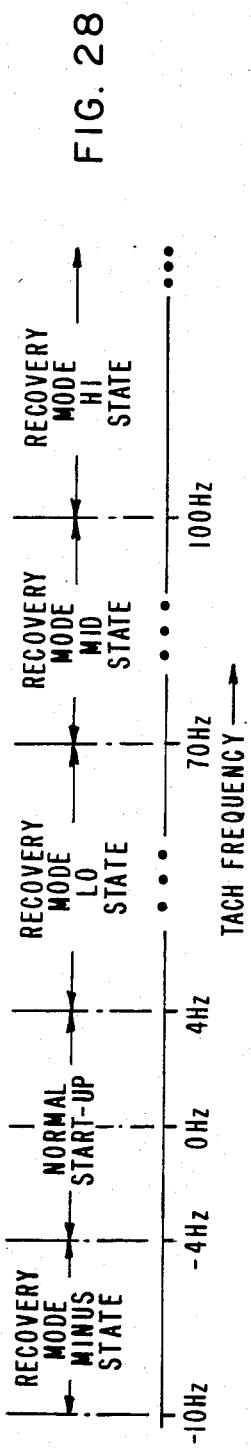
FIG. 28 illustrates the recovery mode states provided by the present invention.

In FIG. 9, there is shown the negative tach test subroutine jumped to from block 318 of FIG. 8. At block 350 a check is made to see if the tractive effort request is greater than zero. If the car is rolling back and the tractive effort request is not greater than zero, the program goes to check exit and lets the friction brake stop the vehicle. If the tractive effort request is greater than zero, then at block 352 a check is made to see if the tach is less than minus 10 Hz, and if it is, this is going to result in an error shutdown as shown in FIG. 28. This would indicate that the car is rolling back faster than about 4 miles/hour, which is an unlikely condition and is actually probably due to a fault in the tachometer and it is not desirable to start up under such conditions. If the car is not rolling back faster than 10 Hz, at block 354 a check is made to see if the absolute value of the tach, which in this case is negative, is greater than 4 Hz. If the car is not rolling back at more than 4 Hz, at block 356 a branch is made to the inverter test subroutine shown in FIG. 13, where a check is made to see if the line voltage is within desired limits. At block 358 the control state is set equal to power open loop. Since the vehicle is rolling backwards, the car must first be slowed to a stop and then accelerated in the desired direction. The process of slowing the vehicle is actually a braking operation, and the torque feedback determination 38 is not reliable at extremely low frequencies below 10 Hz; therefore, the vehicle must be slowed down under an open loop control method. With open loop control, an amount of slip frequency proportional to the car control 17 torque request is applied to the motor and the calculated feedback torque is ignored. The applied slip frequency will result in a motor torque which crudely approximates the desired motor torque. At block 360 a branch is made to a subroutine called normal PWM start shown in FIG. 26 which will start the inverter using PWM synthesis. If there was a tach frequency greater than 4 Hz at block 354, a recovery procedure is required since the motor is rotating and at block 362 a branch is made to the subroutine called inverter test to make sure the line voltage is within desired limits. If it is, then at block 364 the control state is set equal to recovery. At block 366 a subroutine branch is made to the rail gap recovery routine shown in FIG. 14 which will start the inverter using a special recovery procedure that will increase the motor voltage slowly enough so as not to result in large transient currents which would immediately cause the inverter to shut down again.

Figure 10:
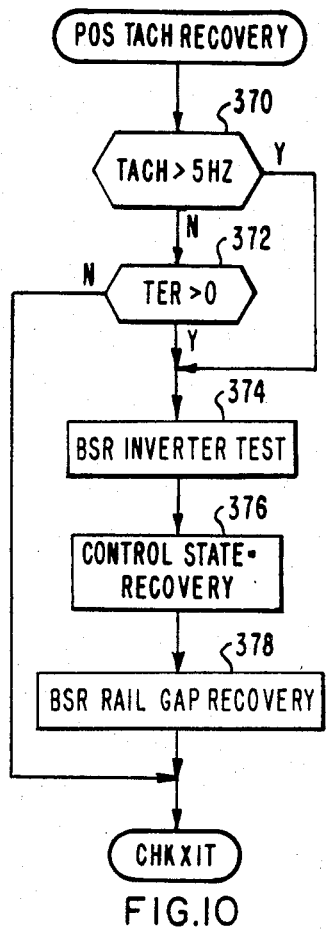
FIG. 10 shows a flow chart of the positive tach recovery routine.

In FIG. 10, there is shown the flow chart for the positive tach recovery routine jumped to from block 320 of FIG. 8. This routine is jumped to from block 320 if the tach frequency is positive and greater than 4 Hz. If the inverter is to be started, a recovery procedure will have to be performed. At block 370 a check is made to see if the tach is greater than 5 Hz, and if it is greater than 5 Hz, it doesn't matter what the tractive effort is. For a four pole motor, 1 Hz of tach frequency is equal to about 30 RPM of the motor. If at block 370, the tach is not greater than 5 Hz and at block 372 the tractive effort request is not greater than zero, then a branch is made to check exit, and the inverter is not started. If either one of those conditions is true, then at block 374 a branch is made to inverter test, which checks the line voltage. At block 376 the control state is set equal to recovery and at block 378 a branch is made to the rail gap recovery subroutine to start the inverter.

In FIG. 11, there is shown the flow chart for the emergency off state routine, which was jumped to from 310 of FIG. 8. This path will be executed if the current control state is EMERGENCY OFF. At block 380 a check is made to see if the recovery timer has timed out. After the inverter is shut down, a certain amount of time is required for all the currents and flux to die in the motor before an effort to start is made to avoid getting a transient and another current overload and shut down again. If this timer is not timed out, the program goes to check exit. If it is timed out, a check is made at block 382 to see if the car controller has approved a recovery. If it is okay to recover, then at block 384, the control state is set to NORMAL OFF thus allowing the inverter to start up in the future if so desired. The inverter cannot be started from the EMERGENCY OFF control state. The control state must be NORMAL OFF for the inverter to be started as shown in FIG. 3.

Figure 12:
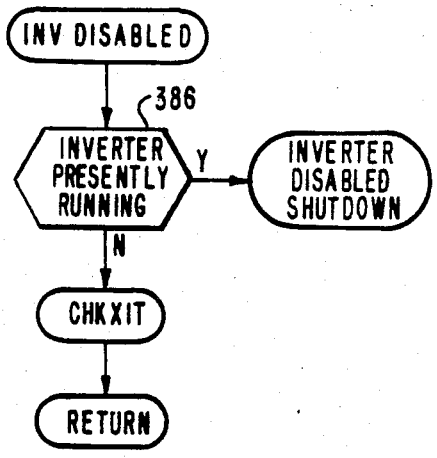
FIG. 12 shows a flow chart of the inverter disabled routine.

In FIG. 12 there is shown a flow chart for the inverter disabled routine jumped to from blocks 300 and 302 of FIG. 8. This routine is executed if the inverter is desired to be off. At block 386 a check is performed to see if the inverter is presently running. If yes, a jump is performed to the shutdown procedure shown in FIG. 4 to shut down the inverter. If the inverter is not presently running at block 386, CHKXIT is jumped to and the inverter remains off.

Figure 13:
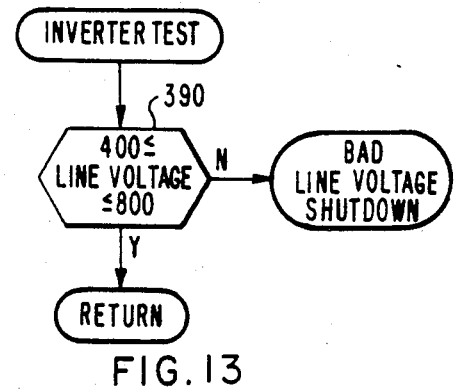
FIG. 13 shows a flow chart of the inverter test routine.

In FIG. 13, there is shown the inverter test subroutine. At block 390, a check is made to see if the line voltage is between the desired limits of 400 and 800 volts. If it is, then a return is made. If not within these limits, then a bad line voltage shutdown will be performed by the shutdown procedure shown in FIG. 4 which will shut down the inverter if it is running.

Figure 14:
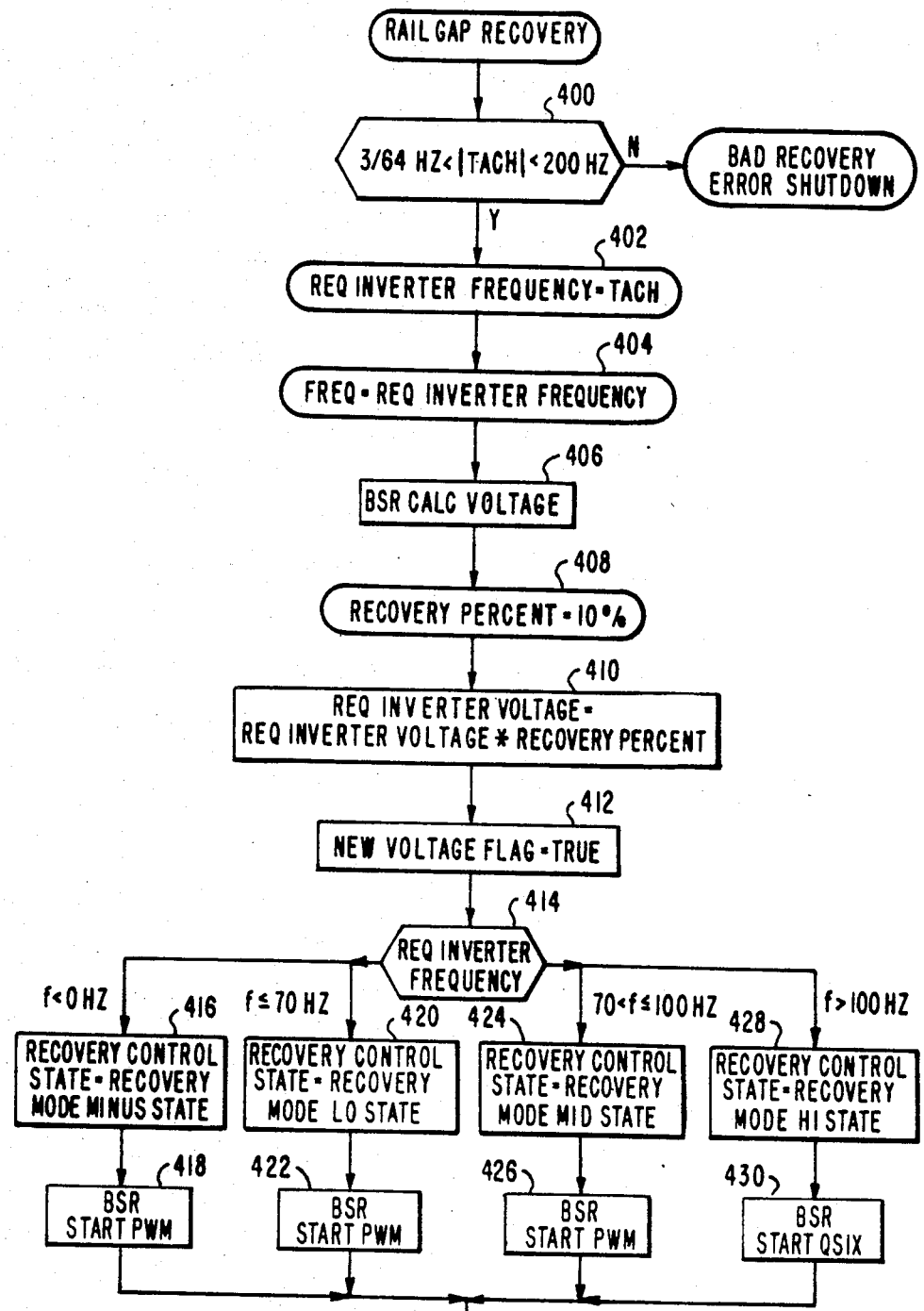
FIG. 14 shows a flow chart of the rail gap recovery routine.

The rail gap recovery routine shown in FIG. 14 is called from block 366 of FIG. 9. This subroutine starts the inverter if the motor is rotating at a speed greater than the equivalent of about 4 Hz which is 120 rpm. It initiates the use of a special recovery procedure which consists of increasing the motor voltage slow enough so that large transient currents do not occur which would immediately result in the inverter shutting back down again due to an overcurrent condition. In block 400, a check is made to see if the absolute value of the tach frequency is between 3/64 Hz and 200 Hz, and if not, a start up of the inverter is not desired and a bad recovery error shutdown is performed by FIG. 4. If those tests pass, at block 402, the requested inverter frequency is set equal to the tach frequency to provide zero slip. In block 404, the frequency is set equal to the requested inverter frequency. At block 406, the calc voltage subroutine is called and this routine takes the frequency that FREQ variable is set to in block 404, and calculates what voltage is desired to keep a constant volts per hertz motor operation, and provides a requested inverter voltage. Since this is a recovery operation, that whole voltage is not applied across the motor. At block 408 a percentage of 10% is selected. At block 410 the requested inverter voltage is set equal to the requested inverter voltage times the recovery percent to determine the volts that are desired. At block 412, the new voltage flag is set equal to true because a new voltage has been determined, so the synthesis operation has to calculate a few extra steps. At block 414 a check is made of the requested inverter frequency. If the requested inverter frequency is less than zero hertz, at block 416 the recovery control state is set equal to the recovery mode minus state as shown in FIG. 28, since there is a negative frequency and at block 418 a branch is made to the START PWM subroutine shown in FIG. 22 for starting the inverter using PWM synthesis. If the frequency is between 0 and 70 Hz, at block 420 the recovery control state is set equal to the recovery mode low state, and at block 422 a branch is made to the START PWM subroutine for a start-up using PWM synthesis. If the frequency is between 70 and 100 Hz, at block 424 the recovery control state is set equal to the recovery mode mid state, and a branch is made to the subroutine START PWM at block 426. If the frequency is greater than 100 Hz, at block 428 the recovery control state is set equal to recovery mode high state. In block 430 a branch is made to the START QSIX subroutine shown in FIG. 27 to start the inverter using Quasi six-step synthesis.

Figure 15:
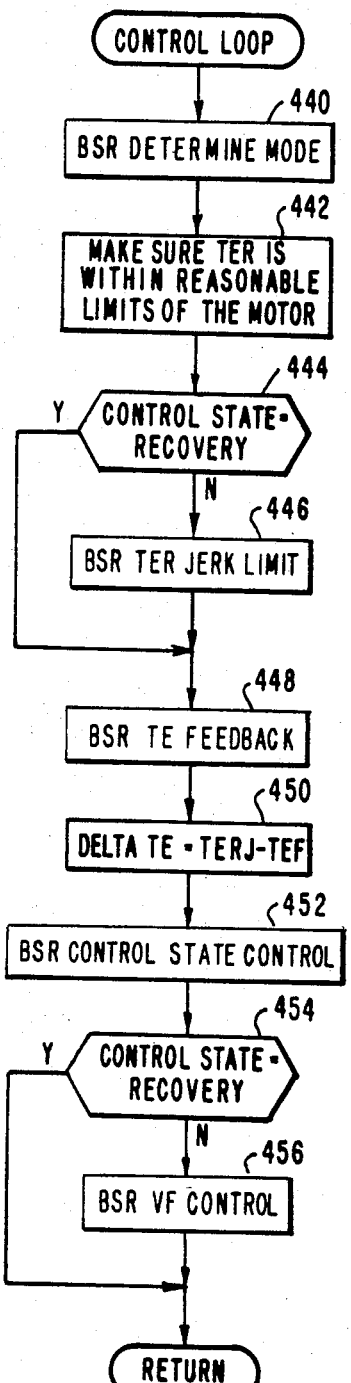
FIG. 15 shows a flow chart of the control loop routine.
Figure 16:
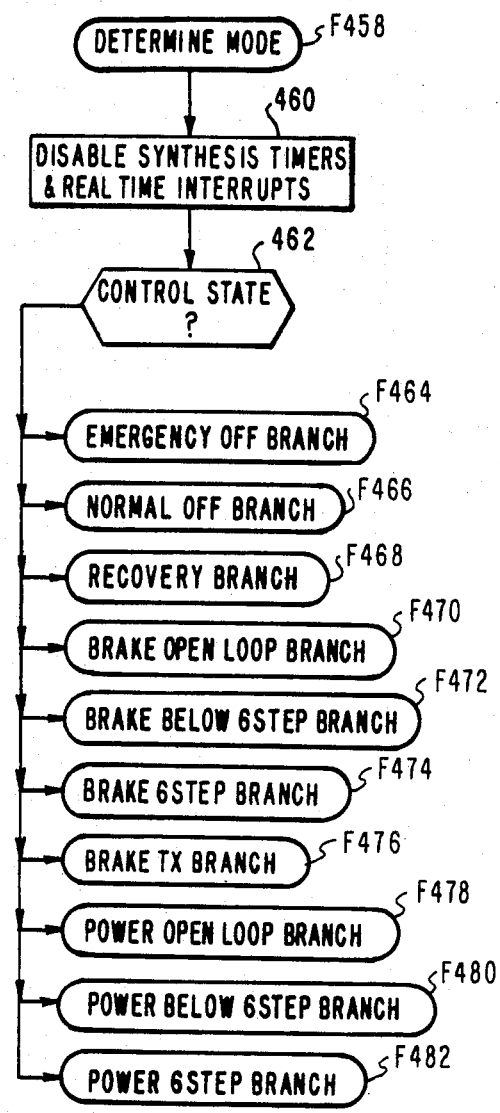
FIG. 16 shows a flow chart of the determine mode routine.

Another subroutine called by the main real time interrupt routine shown in FIG. 7B is the control loop routine shown in FIG. 15, which is the basic control loop program. In block 440 a subroutine called Determine Mode shown in FIG. 16 is called. There are only two places where control state changes are permitted, with one being in this determine mode subroutine, and the other being in the synthesis operation for controlling changes between Quasi six-step and six-step. The control loop subroutine performs all other control state changes. In block 442 the TER or torque effort request coming from the car control is checked to be within reasonable limits of the motor, and it is clamped if not within reasonable limits. At block 444 a check is made to see if the control state equals recovery and if it does not equal recovery, at block 446 a branch is made to the TER jerk limit subroutine, which calculates the jerk limited torque effort request to provide a comfortable change in acceleration. If the control state does equal recovery, it is desired to hold the torque effort request at zero because the motor is held at zero slip until the voltage is brought up. Then TERJ will increase from the zero value set in the recovery state. At block 448, a branch is made to the TE feedback routine, disclosed in the above cross referenced patent application Ser. No. 696,832 FIGS. 4A-4D, to calculate the feedback torque of the motor. In block 450, delta TE is set equal to TERJ−TEF, which is the difference between the desired jerk limited torque effort and the calculated feedback torque effort. Delta TE is an error signal for the motor controller 62 of FIG. 2. In block 452 a branch is made to the control state control subroutine shown in FIG. 18, and this establishes the PI controller for the slip and the integral controller for the transformer voltage. At block 454 a check is made to see if the control state equals recovery, and if it does not at block 456, a branch is made to the V/F control subroutine that checks to see if the inverter frequency is within desired limits and calculates the voltage that corresponds with the inverter frequency. If the control state is equal to recovery, it is not desired to calculate the inverter voltage at this time because for the recovery case the inverter voltage is calculated in the control state control subroutine called by block 452.

In FIG. 16, there is shown the flow chart for the determine mode subroutine called from block 440 in FIG. 15 which determines if a control state change is desirable. If so, the control state is changed to the new desired state. FIG. 3 shows the allowable control states in relation to the recovery state and the allowable control state change paths. The Quasi six-step to six-step transitions are not included since they are controlled by the synthesis routine and not controlled by the determine mode routine. In block 460, the synthesis timers and the real time interrupts are disabled. Since a change of the control state is provided, it is not desired to be in the middle of changing the control state and then get a synthesis interrupt which can also change the control state. During the control state change, it is desired to disable those interrupts. In block 462 a check is made to see what is the present control state and this determines the branch made to a desired routine, such as Emergency Off, Normal Off, Recovery, Brake Open Loop, Brake Below Six-Step, Brake Six-Step, Brake TX, Power Open Loop, Power Below Six-Step and Power Six-Step as shown in FIG. 3.

Figure 17:
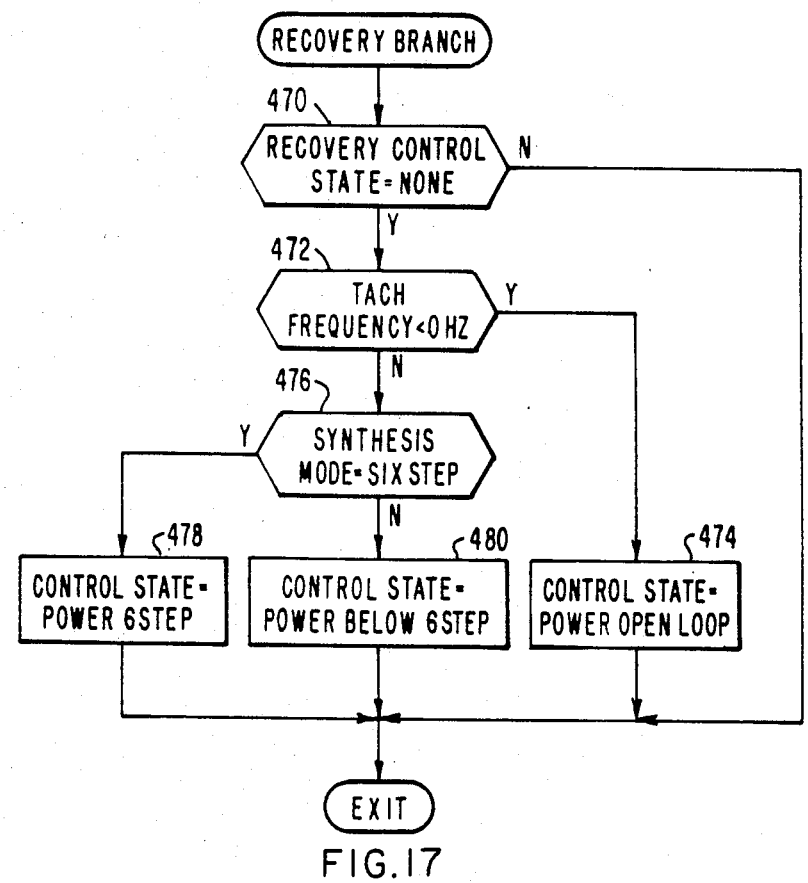
FIG. 17 shows a flow chart of the recovery branch routine.

In FIG. 17, there is shown a flow chart for the recovery branch. When the control state is equal to recovery, this branch is taken. The recovery state consists of substates defined by the recovery control state variable. Recovery control state is equal to one of five values: none, minus, low, mid, and high as shown in FIG. 28. Recovery control state is set equal to one of these last four states by the railgap recovery subroutine shown in FIG. 14 when the recovery procedure is initialized. Upon completion of the recovery procedure, the recovery control state is set equal to none which indicates that the control state can be switched from Recovery to another more desirable state. If the recovery control state is not equal to none at block 470, a jump is made to exit and the operation will remain in recovery. If the recovery state is equal to none, that means the voltage has been ramped up and the control operation is ready to do some torque control again. If it is none, then at block 472 a check is made to see if the tach frequency is less than zero hertz. If it is less than zero hertz, at block 474 the control state is set to power open loop, because when the tach frequency is less than zero hertz, the control has to do open loop power control. If the tach frequency is not below zero hertz, at block 476 a check is made to see if the synthesis mode after recovery is equal to six-step. If it is equal to six-step, then at block 478 the control state is set equal to power six-step. If it is not equal to six-step at block 476, then at block 480 the control state is set equal to power below six-step.

Figure 18:
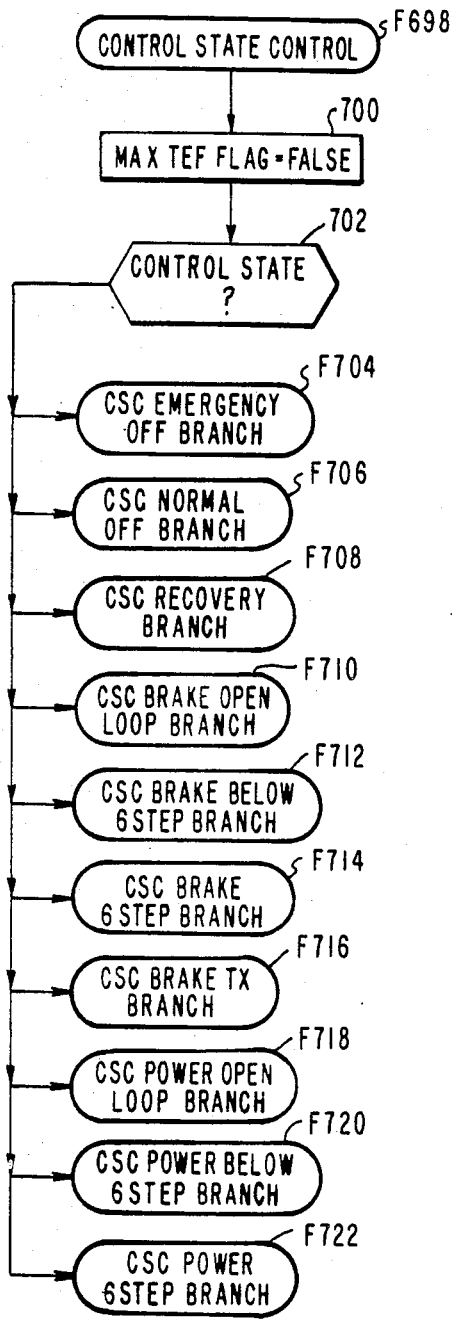
FIG. 18 shows a flow chart of the control state control routine.

In FIG. 18 there is shown the flow chart for the control state control subroutine. At block 700 the max TEF flag is set equal to false and then if the operation goes to a condition where the slip is limited to its maximum extremes, thereby getting the most torque available, this flag is set equal to true. At block 702 a check is made to see what is the current control state and a branch is made to a routine corresponding to that control state. Each branch will perform the type of control necessary for that control state. FIG. 3 shows the possible control states in relation to the recovery state.

Figure 19:
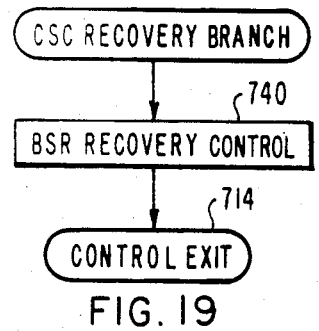
FIG. 19 shows a flow chart of the CSC recovery branch routine.
Figure 21:
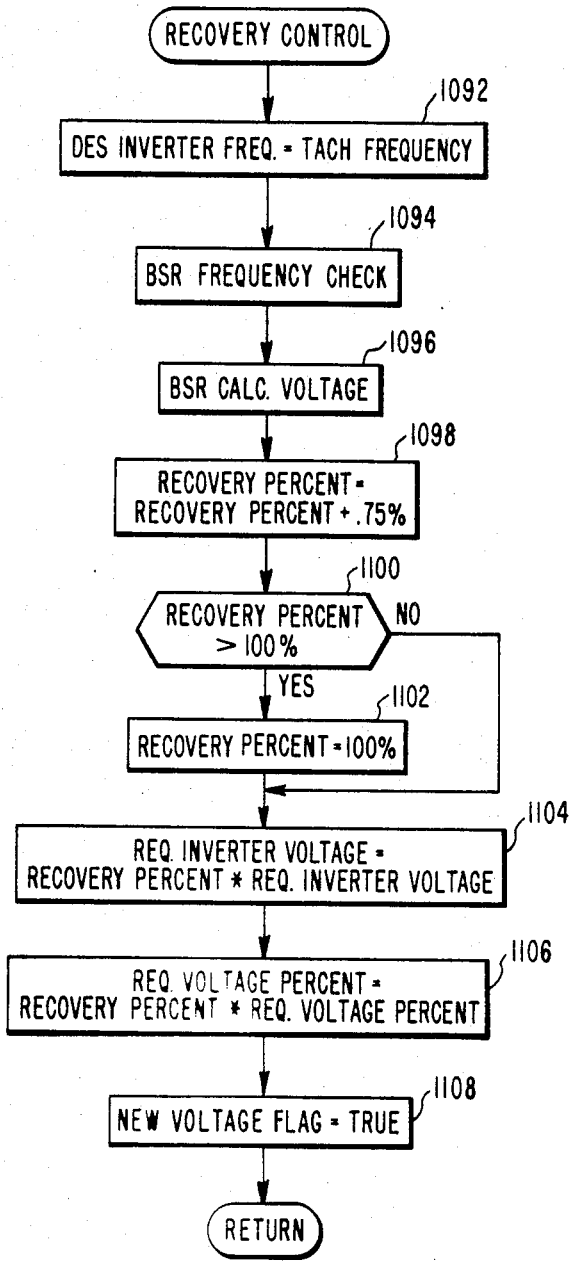
FIG. 21 shows a flow chart of the recovery control routine.

In FIG. 19 there is shown the flow chart for the CSC recovery branch shown in FIG. 18, which makes a branch at block 740 to the recovery control subroutine shown in FIG. 21. While in the recovery control state, the slip frequency is held at zero hertz and neither the slip PI controller or braking transformer voltage PI controller is active. The function of this recovery control state is to ramp up the motor voltage slow enough such that large transient currents do not occur that would shut the inverter down again. The recovery control is used to restart an inverter following a shutdown where the motor is rotating faster than 120 rpm or 4 Hz as shown in FIG. 28.

Figure 20:
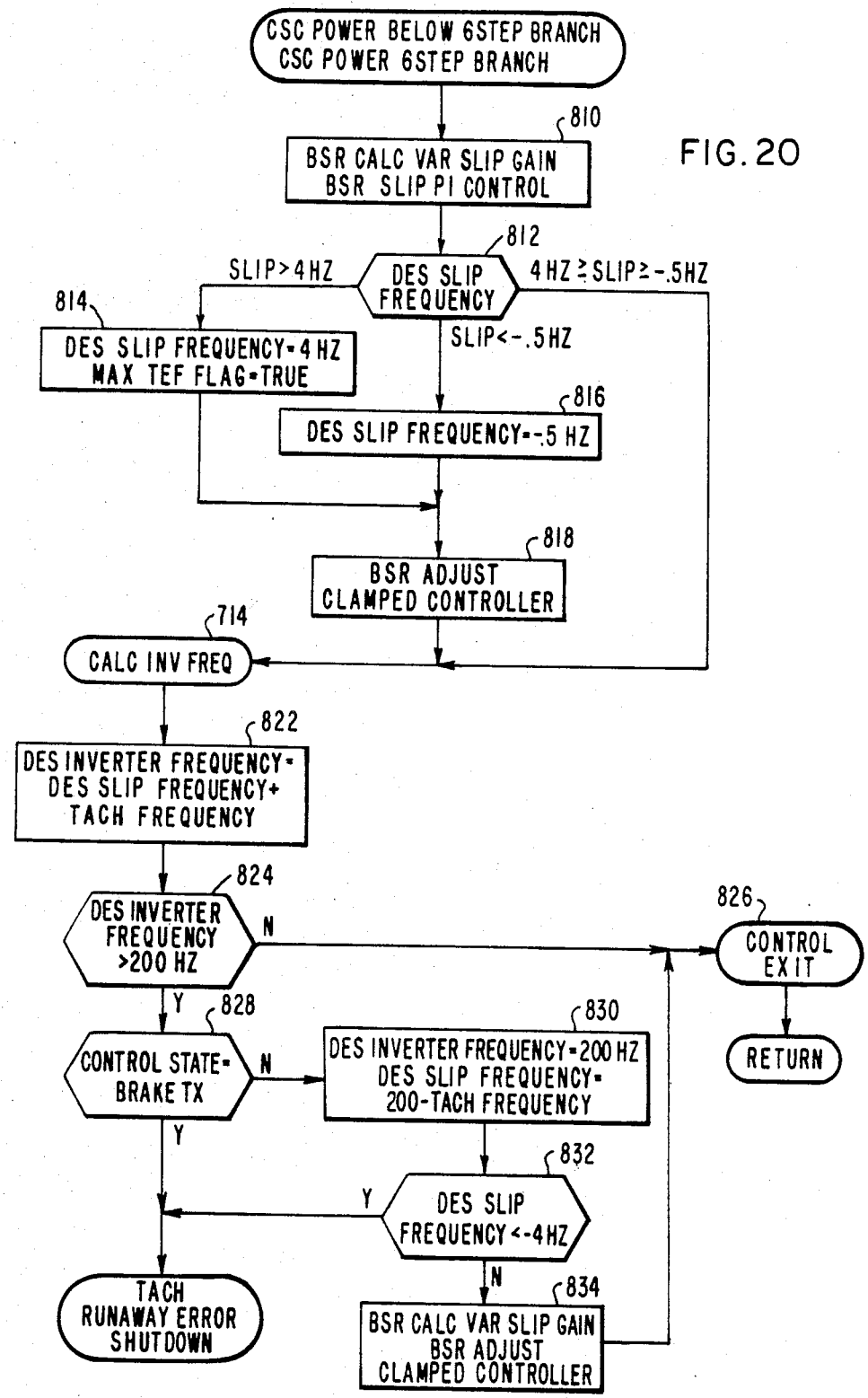
FIG. 20 shows a flow chart of the CSC power below six-step routine and the CSC power six-step routine.

In FIG. 20 there is shown the flow chart for the CSC power below six-step and the CSC power six-step control state branches. Under these two control states, closed loop slip control is used and the braking transformer is out of the motor circuit. In block 810 a branch is made to the variable slip gain calculation and to the slip PI control routine. In block 812 a check is made of the desired slip frequency, and similar to the brake operation there is a limit on the maximum slip. It is not desired to go above 4 Hz and to go less than minus 0.5 Hz, and in either one of those cases it is clamped to those values. In the case of the slip greater than 4 Hz, at block 814 it is clamped to 4 Hz and the MAX TEF flag is set to true. In block 816 it is clamped to minus 0.5 Hz. In block 818 a subroutine branch is made to adjust the clamped controller. If the slip is within limits, then a jump is made around blocks 816 and 818. At label 714 is the beginning of the calculate inverter frequency routine. In block 822 the desired inverter frequency is set equal to the desired slip frequency plus the tach frequency. In block 824 a check is made to see if the desired inverter frequency is greater than 200 Hz, which is the maximum for the motor operation. If not greater than 200 Hz, at block 824, then the routine goes to the control exit label 826. It if is greater at block 824, at block 828 a check is made to see if the control state is brake TX when the motor is above 200 Hz. It is highly unlikely that the motor could be at 200 Hz while the controller is braking the motor, but if such a condition did occur, the inverter and brake circuit would be shut down. If that is not the case, at block 830 the desired inverter frequency is set equal to 200 Hz and the desired slip frequency is set equal to 200 minus the tach frequency. At block 832, a check is made to see if the desired slip frequency is less than minus 4 Hz, and if it is, this would result in a shutdown. If not, at block 834 a branch is made to the variable slip gain calculation and a branch is made to the adjust clamped controller subroutine to clamp the slip controller at the clamped slip amount. At block 826 a branch is made to the control exit routine which makes a return.

In FIG. 21 there is shown a flow chart for the recovery control routine called by the recovery branch routine shown in FIG. 19. At block 1092 the desired inverter frequency is set equal to the measured tachometer frequency to provide a slip frequency of zero for the motor and to result in a no torque operation of the motor. At block 1094 a branch is made to the frequency check subroutine to make sure that a reasonable inverter frequency is requested. At block 1096 a branch is made to the calculate voltage routine to calculate the inverter voltage wanted for the desired inverter frequency, and this establishes the requested inverter voltage and the requested inverter percent for the latter frequency and the desired constant V/F operational relationship. At block 1098 the recovery percent is set equal to the last recovery percent plus 0.75%, and since this is done every 1/240 second, this operation will increase the recovery percent that was initially set at 10% in block 408 of the rail gap recovery routine shown in FIG. 14 up to 100% and full voltage corresponding to the requested inverter voltage in about ½ second. At block 1100 a check is made to see if the recovery percent is greater than 100%, and if so at block 1102 the recovery percent is clamped to 100%. At block 1104 the requested inverter voltage is set equal to the recovery percent times the requested inverter voltage to increase the actual requested inverter voltage up to the calculated constant V/F requested inverter voltage in about ½ second. In block 1106 the requested voltage percent is set equal to the recovery percent times the calculated constant V/F requested voltage percent which is determined by the calculate voltage routine. At block 1108 the new voltage flag is set equal to true, so the synthesis operation will know there is a new requested inverter voltage that might require the calculation of the variables influenced by this voltage.

Figure 22:
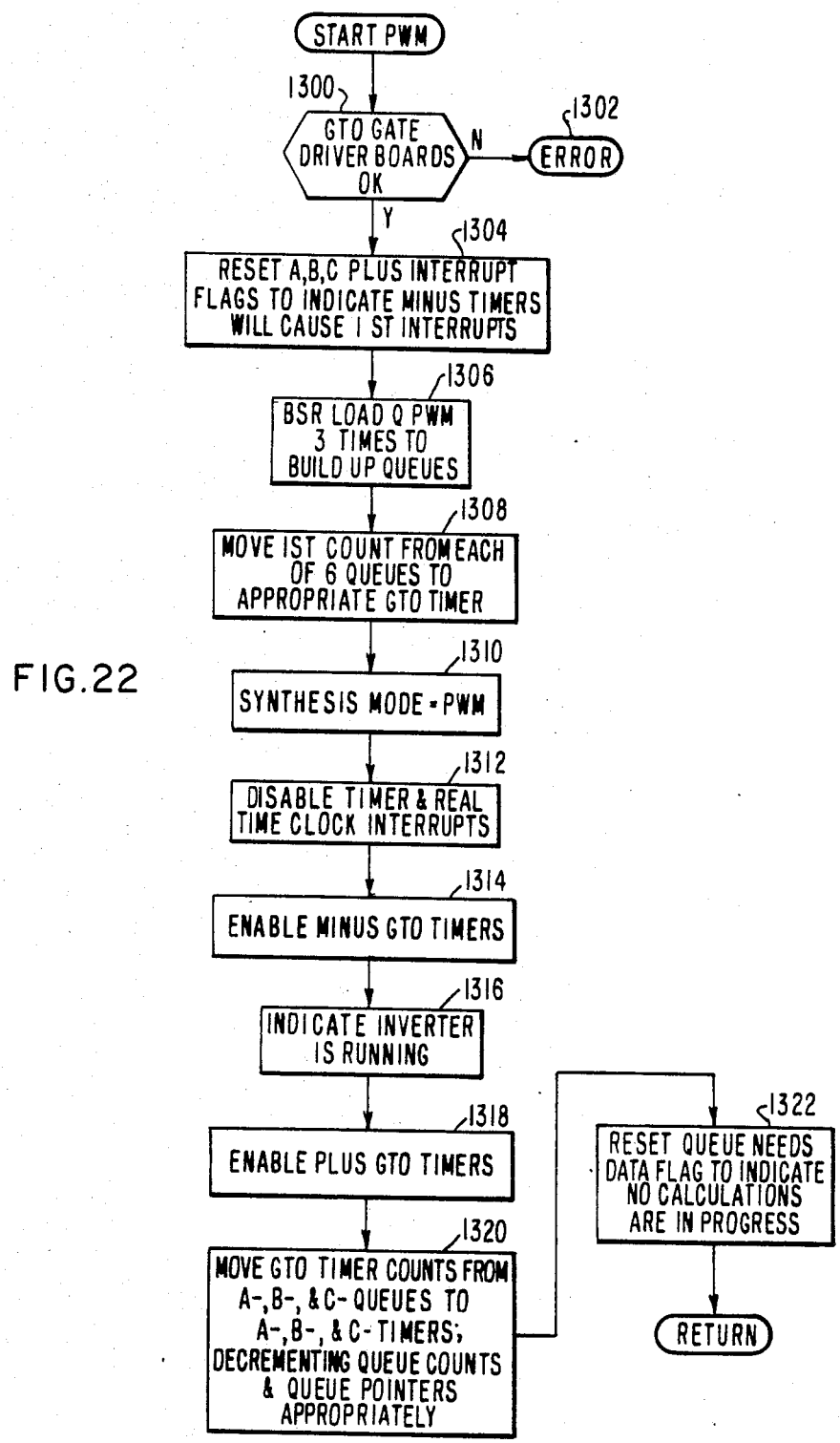
FIG. 22 shows a flow chart of the start PWM mode routine.

In FIG. 22 there is shown a flow chart to illustrate the start of the PWM operation in response to a start up request from the operator. In block 1300 a check is made of the gate drive boards, which have a signal that indicates they are okay or not okay. If not okay, then the program goes to an error routine 1302. If the boards are okay, at block 1304 the A plus interrupt flag, the B plus interrupt flag, and the C plus interrupt flag are reset to indicate that the minus timers will cause the first interrupts. At block 1306 three triangle periods worth of PWM pulses are calculated and loaded into queues. In block 1306, the initials BSR are used as an abbreviation for Branch Subroutine and is used throughout the flow charts. In the case of block 1306, three calls will be made to the subroutine Load Q PWM. In block 1308 the first count from each of the six queues is moved to the appropriate GTO timer, for loading the timers with their first counts. In block 1310 the synthesis mode is set equal to PWM. In block 1312 the timer and realtime clock interrupts are disabled to finish the start-up of the PWM mode before enabling the interrupts. At block 1314 the minus GTO timers are enabled, since the minus GTO timers are started first. In block 1316 a flag is set indicating that the inverter is running, and in block 1318 the plus GTO timers are enabled, but they do not start counting until the minus pulses are up. In block 1320 the GTO timer counts are moved from A-, B-, and C- queues to their respective timers, because one timing pulse is started in each of those timers and another time count can be loaded into the buffer. Also, the queue counts and pointers are decremented appropriately. At block 1322 the queue needs data flag is reset to indicate that no calculations are in progress. A return is made, and the PWM synthesis is started.

Figure 23A:
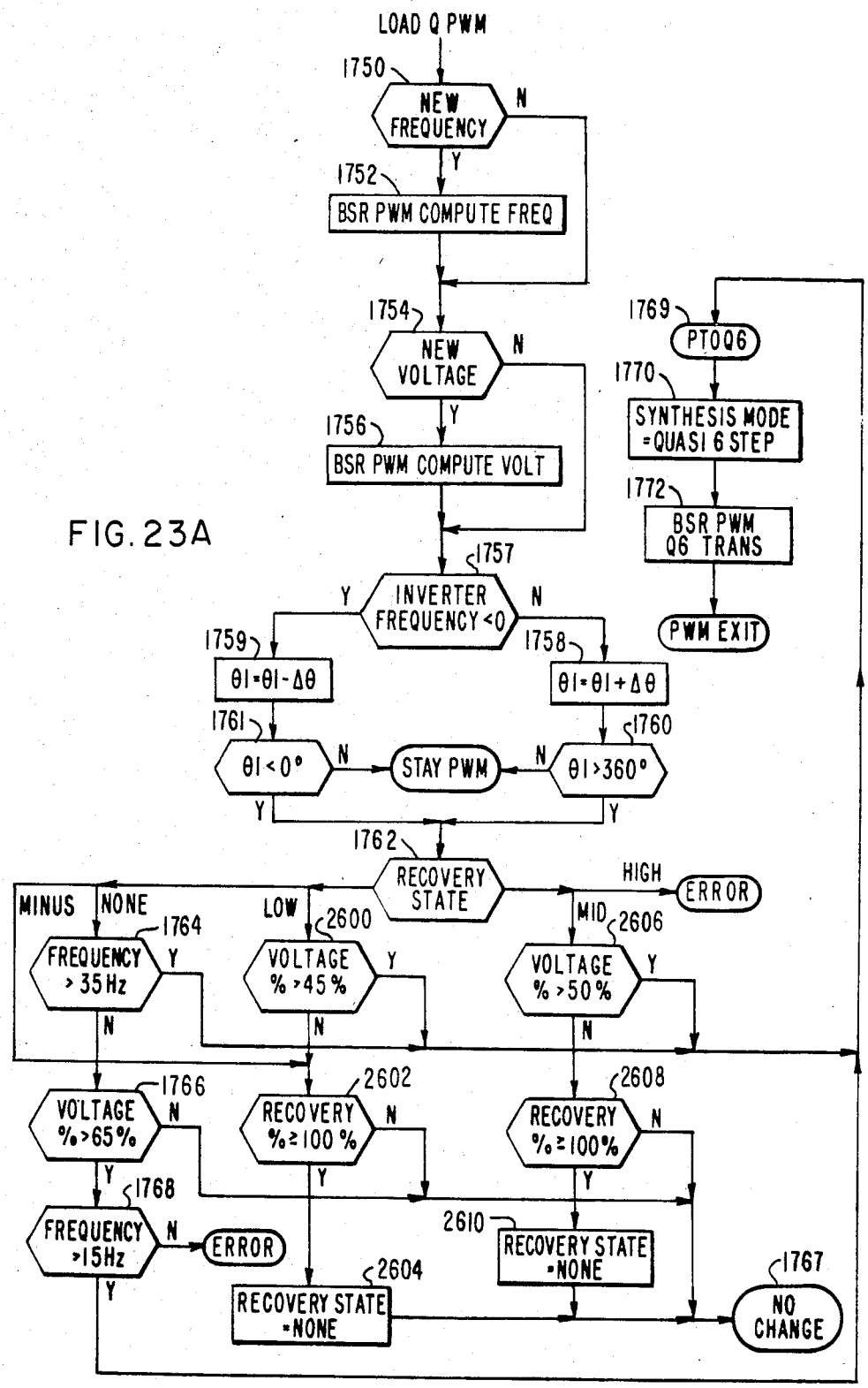
FIGS. 23A, B, C show a flow chart of the load Q in PWM mode routine.
Figure 23B:
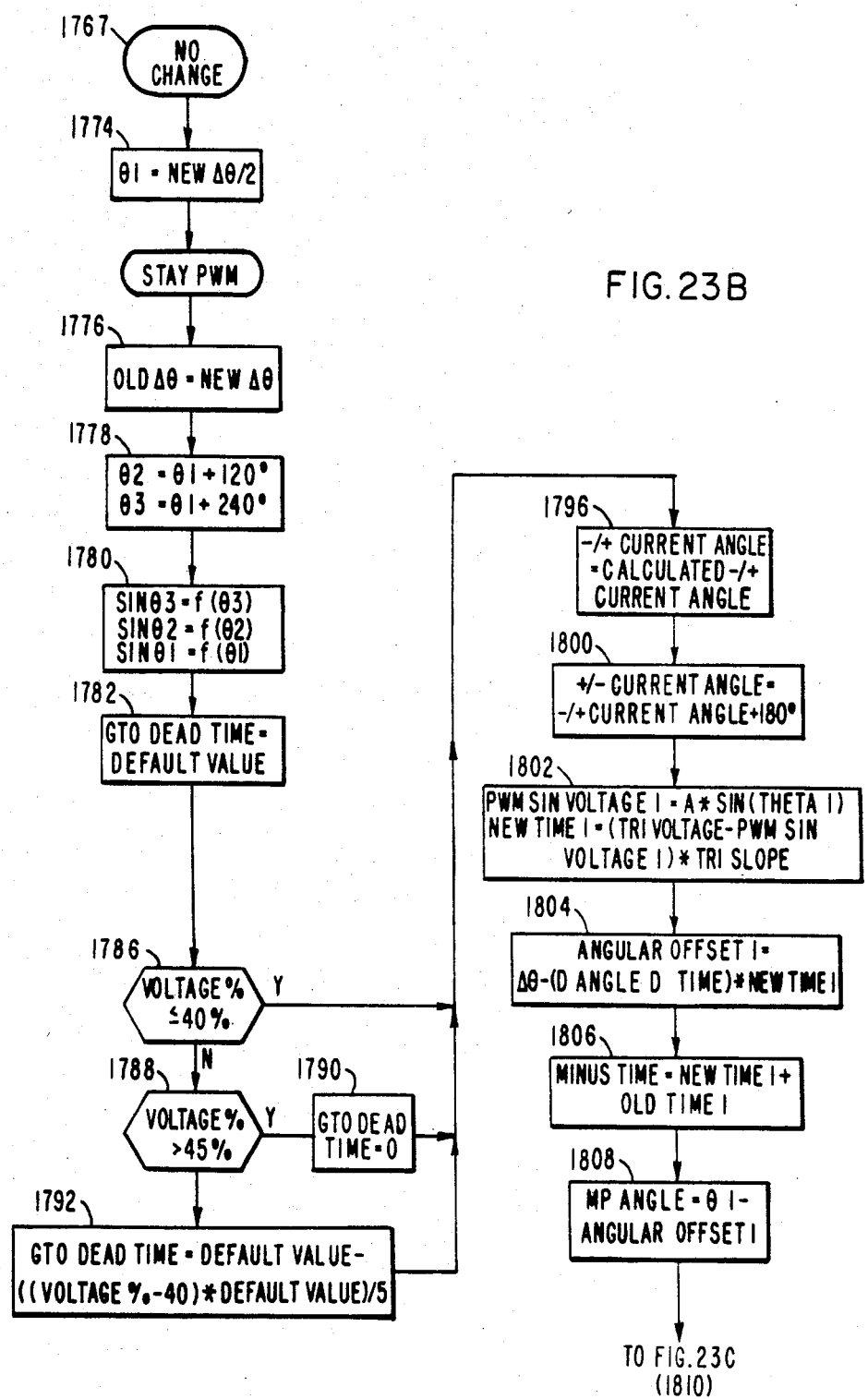
Figure 23C:
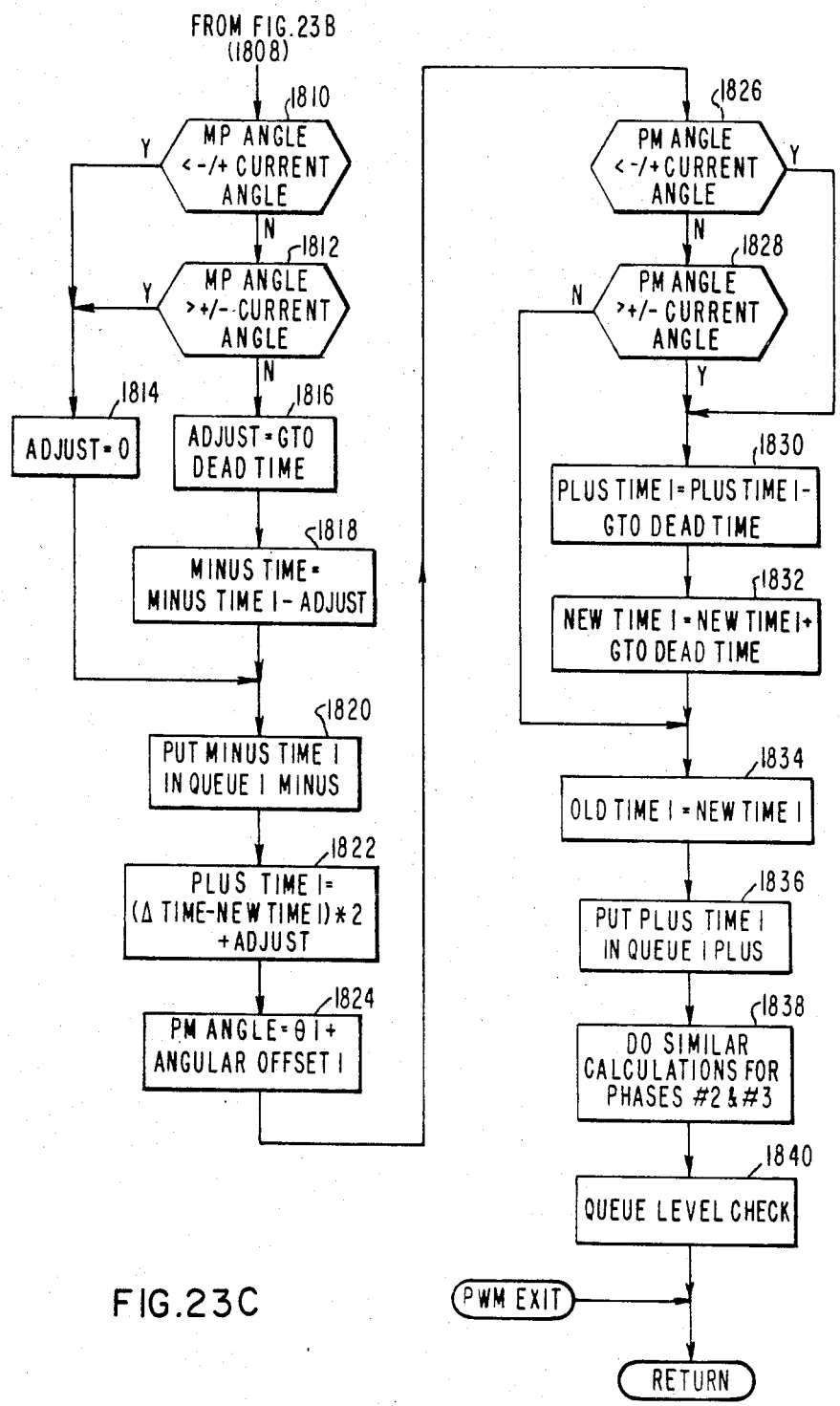

In FIGS. 23A, 23B and 23C there is shown the Load Q PWM routine. At block 1750 a check is made to see if a new frequency is requested by the motor controller 62. If yes, at block 1752 the new frequency related variables are calculated using the compute frequency routine. A check is made at block 1754 to see if a new voltage is requested. If yes, the compute voltage routine is used to calculate the new voltage related variables.

At block 1757, a check is made to see if the inverter frequency is positive or negative. For a load such as a transit vehicle, upon starting from a stationary position on a hill, it is possible for the car to roll backwards initially. The motor must run first in the negative direction and later switch to a positive direction as the car starts to move forward. Simply switching two motor phases to change direction is not desirable because this will result in instantaneous phase shifts in the motor voltage that will result in overcurrent conditions which will shut the inverter down. A smooth motor directional change can be obtained under PWM operation by blocks 1757 through 1761. If the motor is rotating in the reverse direction, block 1759 is executed. Here delta theta is subtracted from the old theta 1 value to form the new theta 1 value where theta 1 is the angular displacement of the phase 1 sine waveform. In block 1761, theta 1 is checked to see if it is less than 0°. If not, a branch to stay PWM in FIG. 23B will occur. If yes, block 1762 will be executed. If the motor is rotating in the proper direction block 1758 will be executed. Here delta theta is added to the old theta 1 value to form the new theta 1 value. In block 1760, a check is made to see if theta 1 is now greater than 360°. If not a branch to stay PWM will result. If so a branch to block 1762 will result. Subtracting delta theta from theta 1 will result in an inverter frequency rotating in the opposite direction as that produced from adding delta theta to theta 1. Also, changing from subtracting to adding will result in a rotational direction change but will not result in any instantaneous phase shifts or other undesirable transients which would result in a rough vehicle ride or even a shutdown. The resulting new theta 1 corresponds to $\theta1$ whereas the old theta 1 corresponds to the corresponding $\theta1$ in the triangle period calculated the last time PWM calculations were performed. The only time a change from PWM to quasi six-step is allowed, is at the 0° crossing of phase A. When theta 1 is greater than or equal to 360° in block 1760 or less than 0° in block 1761, the first triangle period is to be calculated after phase A passes through 0°. This indicates that the operation is at the 0° mark of phase A which means that if conditions are right to switch to quasi six-step, this may be done at this moment. At block 1762, a check is made of the recovery state. Under normal operation, recovery state will be set to none. The recovery state is set to one of the other conditions shown when the inverter has been shut down to an abnormal condition, such as an overcurrent fault or overvoltage fault, and that fault condition has disappeared, and the inverter is desired to be restarted when the motor is already rotating. A special recovery procedure controlled by the motor controller 62 is utilized to bring up the inverter output voltage to its normal operating value. During this special recovery procedure, PWM will be used at frequencies above 35 Hz and requested voltage percent alone will be used to determine if a switch to quasi six-step is warranted. If in normal operation, the program flow will go to block 1764. At block 1764, a check is made to see if the frequency is greater than 35 Hz; and if the frequency is greater than 35 Hz, then a change is made to quasi six-step because it is not desired to stay in PWM at a frequency above 35 Hz. If the frequency is not greater than 35 Hz, at block 1766 a check is made to see if the voltage percent is greater than 65%, if not, then at block 1767 a change is not desired; this will keep the operation in PWM. If the voltage percent is greater than 65%, then at block 1768 a check is made to see if the frequency is greater than 15 Hz, because it is desired to change to quasi six-step; but if for some reason the frequency is not at least 15 Hz, then the change to quasi six-step cannot be made because the frequency is too low. If not, there is an error. Switches between synthesis modes are also affected by the percentage of full voltage requested out of the inverter. If the DC line voltage is less than 600 volts, the PWM/Quasi six-step switch points will occur at proportionally lower frequencies. However, this lower frequency is limited to no less than 15 Hz. If at block 1764 or at block 1768 there is a decision to go to quasi six-step, a jump is made to the P to Q6 block 1769. In block 1770, a change to quasi six-step synthesis is desired, so the synthesis mode is set equal to quasi six-step, and then a subroutine call is made to the PWM to quasi six-step transition routine at block 1772. This PWM to quasi six-step transition routine will calculate the time pulses between 0° to 60° and which are called the PWM to quasi six-step transition time pulses. If at block 1762 recovery is in the minus state, at block 2602 a check is made to see if the recovery percent is greater than or equal to 100%, and if it is not, the operation will remain in PWM at bubble 1767. If yes at block 2602, then the recovery state is set equal to none and a jump is made to bubble 1767 to remain in PWM. If the recovery state equals low, which means the frequency is between 0 Hz and 70 Hz, then at block 2600 a check is made to see if the voltage percent is greater than 45%. If it is, then the operation will change to quasi six-step with a branch made to bubble 1769. If not, a branch is made to block 2602 to check if the recovery percent is greater than or equal to 100%, and if it is, then the recovery state is set equal to none. If recovery state at block 1762 equals mid, which means the frequency is from 70 to 100 Hz, at block 2606 a check is made to see if the voltage percent is greater than 50% and if it is, then a jump is made to bubble 1769 to change to quasi six-step. If not, at block 2608 a check is made to see if the recovery percent is greater than or equal to 100%. If it is, the recovery state is set equal to none at block 2610. If not, a branch is made to bubble 1767 to stay in PWM. If the recovery state is equal to high at block 1762, that is an error condition since the operation cannot be in PWM above 100 Hz. If the theta 1 criteria in blocks 1760 or 1761 results in a yes answer and a decision to stay in PWM was made in subsequent tests, a branch would be made to the no change routine in block 1767. At block 1774 theta 1 is set equal to the new delta theta divided by 2. Due to computational roundoff error theta 1 must be reinitialized at the beginning of every 360° cycle to insure that the roundoff errors do not accumulate. New delta theta as the period of the triangle wave and theta 1 would equal new delta theta divided by 2. In block 1760 or 1761, if theta 1 does not satisfy the angle requirements, then a branch is made to stay PWM in block 1761, which is where the operation is now. Delta theta is equal to new delta theta, so in block 1776 old delta theta is set equal to new delta theta. At block 1778 theta 2 is set equal to theta 1 plus 120°, and theta 3 is set equal to theta 1 plus 240° to set up theta for the other two phases. At block 1780 the sine of theta 3 is obtained from a lookup table as a function of theta 3, the sine of theta 2 is obtained from a lookup table as a function of theta 2, and the sine of theta 1 is obtained from a lookup table as a function of theta 1.

At block 1802 the PWM sine voltage for phase 1 is set equal to the amplitude of the approximated sine waveform times the sine of theta 1. And new time 1, which is the displacement from the beginning of the triangle period to the crossing of the approximated sine waveform, is set equal to the triangle voltage minus the PWM sine voltage 1 times the triangle slope where the triangle voltage equals 600 volts.

In an actual inverter, dead times where both GTOs are off must be inserted whenever one GTO of a pole is turned off and the other GTO in the same pole is turned on. These dead times last 30 to 35 microseconds and affect the output voltage from the inverter depending upon how much the motor current lags the motor voltage. If the lag is less than 90° with the motor in power, the inverter output voltage will be reduced. If the lag is more than 90° with the motor in brake, the inverter output voltage will be increased. At low output voltage percentages, these dead times should be compensated for to provide proper motor operation. The dead times can be properly compensated for by advancing the −GTO to +GTO transition if the motor current flow from the inverter to the motor for that pole is positive at the time of the GTO switch transition. If the motor current is negative at the time of the GTO switch transition, the +GTO to −GTO transition is advanced. This modification of the transition point negates the effects of the GTO dead times. Also other losses in the inverter result in similar dead time voltage effects. These other losses can be compensated for by using a larger than 30 to 35 microsecond adjustment. Through experimental methods, a value of about 65 microseconds for the transition adjustment practically negates all dead times and inverter losses. The default value in block 1782 is equal to this 65 microsecond value. The GTO dead time in block 1782 is set equal to the default value and represents the amount of time that the GTO transistions will be adjusted. It is both time consuming and unnecessary for the GTO transitions to be adjusted while in quasi six-step or six-step, so the transition adjustment is phased out while in PWM synthesis. Once the requested voltage percent reaches 40% the phase out begins by decreasing the compensation time so that by the time the voltage percent equals 45% this compensation time variable called GTO dead time, is equal to zero. The compensation time must be phased out gradually because a drastic change will result in unwanted motor transients. Block 1786 tests the requested voltage percent to see if it is less than or equal to 40%. If yes, a GTO dead time equal to default value will be used. If not, in block 1788, the voltage percent is checked against 45%. If greater than 45%, block 1790 will set GTO dead time equal to zero, thus eliminating the transition correction. Block 1792 is executed if the voltage percent is between 40% and 45% and calculates a GTO dead time value which is between zero and the default value. At block 1796 the ± current angle, which is the angle that the current lags the voltage, is set equal to a calculated lag angle. This calculated lag angle is calculated by the motor controller 62. This angle could also be measured with external hardware if so desired. In block 1800, the ± current angle is set equal to the ∓ current angle +180°. The motor current for phase 1 is negative between 0° and ∓ current angle, positive between ∓ current angle and ± current angle, and negative between ± current angle and 360° in relation to the voltage angle.

In block 1804, angular offset 1 is set equal to delta theta minus the quantity D angle D time multiplied by new time 1. D angle D time represents the per unit angular offset represented by a per unit time. Angular offset 1 represents the angular period represented by time C in FIG. 12.

Block 1806 determines the minus time, which is A ± B and is equal to the new time 1 plus the old time 1, where the old time 1 is the time A left over from the last calculation period. In block 1808, MP angle is set equal to theta 1 minus the angular offset 1. MP angle represents the angle at which the minus time calculated in block 1806 ends. In other words, MP angle is the angle at which the −GTO to +GTO transition will occur. In block 1810, this MP angle is compared with the ∓ current angle to see if the motor current is negative at the time that the −GTO to +GTO transition occurs. If MP angle is less than ∓ current angle, then the motor current is negative and no adjustment will be made to the −GTO to +GTO transition and adjust is set equal to zero in block 1814. If the MP angle is not less than ∓ current angle, the current has a chance at being positive at the −GTO to +GTO transition point. In block 1812, if MP angle is greater than ± current angle, the current is negative and block 1814 will set the adjust equal to zero. But if MP angle is less than or equal to ± current angle, the current is positive at the −GTO to +GTO transition point and adjust is set equal to GTO dead time in block 1816. In block 1818 the minus time calculated in block 1806 is adjusted by subtracting adjust from it. This subtraction will in effect advance the −GTO to +GTO transition point to adjust for the dead time. At block 1820, the minus time 1 is put into the minus queue for phase 1.

At block 1822, the plus time 1 is calculated as equal to the delta time, which is the half of the period, minus new time 1, which is defined by B, which gives the C time, and the C time is multiplied by 2 and adjust is added. Since C=D, then two times C, gives the plus time. Adding the adjust time completes the −GTO to +GTO transition compensation for the dead time effects.

At block 1824, PM angle is set equal to theta 1 plus the angular offset 1. PM angle represents the angle at which the plus time calculated in block 1820 ends. In other words, PM angle is the angle at which the +GTO to −GTO transition will occur. In block 1826, this PM angle is compared with the ∓ current angle to see if the motor current is negative at the time that the +GTO to the −GTO transition occurs. If PM angle is less than ∓ current angle, then the motor current is negative and an adjustment will be made to the +GTO to −GTO transition starting with block 1830. If the PM angle is not less than ∓ current angle, the current has a chance at being positive at the +GTO to −GTO transition point. In block 1828, if PM angle is greater than ± current angle, the current is negative and block 1830 will be executed. If PM angle is not greater than ± current angle, the current is positive at the +GTO to −GTO transition and no adjustment for dead times is needed; therefore the program jumps to block 1834. In blocks 1830 and 1832, the +GTO to −GTO transition point is advanced to compensate for dead time effects. Plus time 1 is adjusted by subtracting GTO dead time in block 1830, and new time 1 is adjusted by adding GTO dead time in block 1832. The result of the calculations in blocks 1830 and 1832 is to advance the +GTO to −GTO transition point.

At block 1834 the old-time 1, which is time E is set equal to new-time 1, which is time B. In block 1836 the plus-time 1 is put into the 1 plus queue. So there has now been calculated a minus time and a plus time. At block 1838 for phase 2 and phase 3, calculations are made similar to those made for phase 1, both the plus and minus times. At block 1840 a check is made to see if the queues are all filled.

If the operation is in quasi six-step, the load queue quasi six-step routine shown in FIGS. 24A, 24B, 24C and 24D is called. At block 1900 a check is made to see if there is a new voltage request. If there is a new voltage request, then at block 1902 there are calculated new voltage related variables using the queue six-step mode compute voltage routine. At block 1904 there are calculated new W times using the compute W's routine shown in FIG. 25, because if the voltage-related variables are changed, then new W times are desired. At block 1906, if a new voltage was not requested, a check is made to see if a new frequency was requested. If so, then at block 1904 compute the new W times.

At block 1910 a check is made to see if the frequency is greater than or equal to 15 Hz. If it is not, there is an error. If the frequency is greater than 15 Hz, at block 1912 a check is made to see if theta 1 is equal to 300. If theta 1 is equal to 300°, it is possible to make the transition to six-step at block 1913. If theta 1 does not equal 300°, then at block 1914 a check is made to see if the operation is in recovery. Assume it is not; so at block 1916 a check is made to see if theta 1 is equal 0°. This check determines if the operation can go to PWM. At 0° is where the transition is made to PWM. If theta is not 0°, then a branch is made to LOAD at block 1915 where the regular quasi six-step calculations are performed. If theta is equal to 0°, then a check is made to see if there is a desire to switch to PWM. At block 1918 a check is made to see if the frequency is greater than or equal to 30 Hz. If it is greater than or equal to 30 Hz, there is no desire to switch to PWM; but if in block 1918 the frequency is not greater than or equal to 30 Hz, then a check is made to see if there is a desire to switch to PWM. At block 1920 a check is made to see if the voltage percent is greater than 59%, and if yes, then the operation will stay in quasi six-step. If less than 59%, then at block 1922 the synthesis mode is set equal to PWM, and in block 1924 a branch is made to the quasi six-step to PWM transition routine, which will ease into the PWM synthesis at 0°.

At block 1912 in FIG. 24, if theta 1 is equal to 300°, then a branch is made to the quasi six-step to six-step transition is possible routine at block 1913.

At block 1926 the control state is checked, and if the control state is brake below six-step at block 1928 a check is made to see if the quasi six-step timer is timed out. This is a 0.2 second timer which prevents the control state going back and forth between quasi six-step and six-step too many times because whenever a change is made from quasi six-step to six-step and back again, a small transient results that could produce some problems. When a change is made from six-step to quasi six-step the operation should remain in quasi six-step for 0.2 seconds before going back to six-step. If that quasi six-step timer is not timed out, the operation will just remain in quasi six-step and a branch is made to bubble 1915 which is the load routine. If the timer is timed out, then in block 1930, a check is made to see if the voltage percent is greater than or equal to 100% and if it is not, then the operation will remain in quasi six-step at bubble 1915. If yes at block 1932 a check is made to see if the frequency is greater than 67 Hz. If it is greater than 67 Hz, then the program goes to the quasi six-step transition okay bubble 1946 and that will perform the transition to six-step. If in block 1932 the answer is no, then at block 1934, a check is made to see if the slip is less than −0.8 Hz, which is more negative than −0.8 Hz. If it is not more negative than −0.8 Hz, then at bubble 1915 the operation will remain in quasi six-step. If it is, then at bubble 1946 a branch is made to six-step. If this is in braking, it is not desired to remain in quasi six-step if the slip is less than −0.8 Hz, because that means the transformer may be needed and in order to have the transformer, the operation has to be in six-step. If this is power, the use of quasi six-step is allowed up to 67 Hz. At block 1926, if the operation is in brake TX state, then a branch is made to block 1936 where a check is made of the brake control state. If the brake control state is either TX below six-step or TX below six-step trans, then a branch is made to block 1938. If not, then there is some problem with the software and a branch is made to the error routine at bubble 1937 for a shutdown. At block 1938 a check is made of the quasi six-step timer to see if it is timed out. If it is not timed out, the operation will remain in quasi six-step at bubble 1915. If this timer is timed out, before a switch is made to six-step, in block 1940 a check is made to see if the voltage percentage is greater than or equal to 100%, and if not, then the operation will remain in quasi six-step at bubble 1915.

At block 1926, if the control state is power below six-step, a branch is made to block 1942 where a check is made to see if the quasi six-step timer is timed out. If not, the operation will remain in quasi six-step at the bubble 1915. If the answer is yes at block 1942, then at block 1944, a check is made of the voltage percent to see if it is greater than or equal to 100%. If not, the operation will remain in quasi six-step. If yes, at block 1945 a check is made to see if the frequency is greater than 67 Hz and if it is not, the operation will remain in quasi six-step and jump to bubble 1915. If the frequency is up above 67 Hz at block 1945, then a transition can be made to six-step and a jump is made to bubble 1946 which is the quasi six-step transition okay routine and then at block 1947 a branch is made to the quasi six-step to six-step transition subroutine which will perform the transition calculations.

At block 1926 if the control state is recovery, at block 1927 a check is made to see which recovery state. The recovery state is provided after a shutdown of the inverter with the motor still rotating and it is desired to bring up the inverter again. A special procedure is provided to bring back the voltage slowly across the motor, since it is not desired to put the full voltage across the motor or else there can be overcurrent trips because there is not enough back EMF of the motor to oppose the line voltage and this can result in a high motor current. The states of the recovery procedure are none, low, mid, high and minus, which are based on the inverter frequency at the start of the recovery procedure. None indicates the operation is not in a recovery and is in normal operation. Low is a frequency below 70 Hz, mid is a frequency between 70 Hz and 100 Hz, and high is above 100 Hz. Minus is a frequency that is negative, with the motor rotating in the reverse direction so in effect there is a negative frequency. The reasons for having these different recovery states is the need to use different types of synthesis in order to bring up the voltage. For example, above 100 Hz, it is not desired to use PWM, so above 100 Hz one angle quasi six-step is used. For a frequency of 70 to 100 Hz, PWM and quasi six-step is used. If the recovery state is none, the same operation is provided as was done when the control state was power below six-step, since the operation was in recovery and has now finished and is ready to switch to a regular control state so it might as well operate as if it was in power below six-step. If the recovery state is low at block 1927, then at block 1929 a check is made to see if the recovery percent is greater than or equal to 100%. The motor operation requires a certain voltage percent across the motor to maintain the desired constant volts per hertz and in the recovery procedure the operation starts at a low percentage of that voltage and then builds up to 100% of that voltage to provide a gradual build up to reduce the transients on the motor. Once the voltage is 100%, that means the recovery state is done. In the low recovery state below 70 Hz, if the recovery percent is greater than or equal to 100% the recovery state is done and at block 1931 the recovery state is set equal to none to tell the main control loop that recovery is done and it is time to switch to another major control state other than recovery and a branch is made to the load bubble 1915. If the recovery state is mid or high at block 1927, which means the frequency is above 70 Hz, then at block 1933 a check is made to see if the recovery percent is greater than or equal to 100% and if yes at block 1935 the recovery state is set equal to none and a branch is made to the quasi six-step transition okay at bubble 1946 which means the operation can go to six-step.

If the recovery state has a negative frequency, the recovery state is equal to minus. To keep the motor from going the wrong way too fast, the syntheses will remain in PWM if the motor is going in the reverse direction. The recovery state equal to minus indicates there is a negative inverter frequency and recovery will use PWM. When the recovery state is equal to low, this means the inverter frequency is between 0 and 70 Hz on the motor and the synthesis starts with PWM, and the synthesis can switch to quasi six-step but will not switch to six-step. Depending on the quasi six-step to six-step transition criteria, at the end of the recovery state the operation will still be in quasi six-step and after that, if the control wishes, it can switch to six-step. In the 70 Hz to 100 Hz range in mid-recovery state, the synthesis starts with PWM and changes to quasi six-step, and when the recovery ends a change can be made to six-step. In the high recovery state above 100 Hz, PWM is not used because the switching frequency would be too high and one angle quasi six-step is used to keep the switching frequency down and a change is made to six-step at the end of the recovery.

At block 1926, if the operation is in any other control state, there is a problem with the software and a branch is made to the error or shutdown routine shown in FIG. 4 to shut down the inverter.

The motor controller which is block 62 of FIG. 2 is what determines the recovery state and also controls the raising of the recovery percent from its minimum percent up to 100%. If the program stays in quasi six-step a branch is made to the bubble 1915 called LOAD, at block 1948 a check is made to see what theta 1 is. Theta 1 can either be 0°, 60°, 120°, 180°, 240°, or 300°, and this relates to the beginning of each 60° section of GTO firing times to be calculated. When theta 1 is zero, the program goes to the zero bubble 1950. For the phase 1 waveform at block 1952 W1 is the first time and that goes into the 1 minus queue. At block 1954 a check is made to see if W2 and W3 equal zero, since if one is zero, the other one is going to be zero, because sometimes it is desired to eliminate these pulses. For example, for high percentages of voltages, it is desired to drop down to three angles. If W2 and W3 are not zero, at block 1956 W2 is moved to the plus queue for phase 1 and W3 is moved to the minus queue. At block 1958 a check of W4 and W5 is made to see if they are zero, and if not, then at block 1960 the W4 pulse is moved to the plus queue of phase 1 and the W5 pulse is moved to the minus queue. At block 1962 old-time 1 is set equal to W6, since the last W6 which completes the 60° does not make up a full pulse, so it is called old-time 1. For phase 2 at block 1964, the W6 time is the first pulse showing so W6 is added to the old-time 2, and that would give a plus pulse that is moved to the plus queue. In block 1966 a check of W4 and W5 is made to see if they are zero, and if not at block 1968 W5 is moved to the 2 minus queue and W4 is moved to the 2 plus queue. At block 1970 a check is made to see if W2 and W3 are zero. If not, at block 1972 W3 is moved to the 2 minus queue and W2 is moved to the 2 plus queue. At block 1974 W1 is moved to the 2 minus queue. In block 1976, looking at the third phase VC, this phase will not result in any pulses being calculated in this time, so take time sixty and add it to the old-time 3, which was a W6 time left over from the last 60° calculation. At block 1980, 60° is added to theta 1, and at block 1982 a check is made to see if theta 1 is less than or equal to 300°. If it is not less than or equal to 300°, then that means it is 360°, and at block 1984 theta 1 is reset equal to 0°. At block 1986 a queue level check is made to see if any of the queues are in need of more times such that another 60° should be calculated. And then the routine ends at return.

The other cases shown in FIG. 24 for 60°, 120°, 180°, 240°, and 300° are functionally similar to the 0° case described. The example for 60° is shown in FIG. 24E. Then a branch may be made to the CONT bubble 1978 in FIG. 24D.

In FIGS. 25A to 25D the compute W's routine is shown. At block 1870 the inverter frequency is set equal to the requested inverter frequency. At block 1872 the new frequency flag is reset, and at block 1874 the recovery control state is checked. If it is in the high recovery, a branch is made to one angle quasi six-step at bubble 1500, since that should be used. If the operation is in the low recovery state, with a frequency below 70 Hz, at block 1562 a check is made to see if the frequency is greater than or equal to 56 Hz. If it is greater than 56 Hz a branch is made to bubble 1502 to use three angle quasi six-step. If not, at block 1564 a check is made to see if the frequency is greater than or equal to 54 Hz. If it is not greater than or equal to 54 Hz, a branch is made to bubble 1504 for five angle quasi six-step. If yes, then at block 1566, with the frequency between 54 and 56 Hz, whatever was used the last time will be selected and this provides the hysteresis band of 2 Hz. The Q6 angle status check at block 1566 keeps track of how many angles of quasi six-step the operation is presently in and if it is set to three, the operation will remain in three angles, and if it is set to five, the operation will remain in five angles. If the recovery state in block 1874 is equal to mid which means the frequency is between 70 and 100 Hz, then at block 1568, the Q6 angle status is set equal to three because it is desired to use three angle quasi six-step and at block 1570 the pointer is set to the three angle recovery lookup table. The three angle recovery lookup table is different than the normal three angle quasi six-step lookup table, and has a little bigger angles since this operation is at a higher frequency than is normally done in quasi six-step. This operation is above 70 Hz whereas the normal quasi six-step is below 70 Hz. Since under recovery it is required to do some quasi six-step above 70 Hz, there is provided this special three angle table. At bubble 1516 which is Q six 3 Table read, the rest of the calculations are done. At block 1874, if the recovery control state equals none, which indicates the operation is in recovery, at block 1876 a check is made to see what the current quasi six-step angle status is, and it could be either 1, 3 or 5. If it is one angle, then at block 1878 a check is made to see if the frequency is greater than 70 Hz, if it is, the operation will remain in one angle. If not, then at block 1880 a check is made to see if the frequency is greater than or equal to 54 Hz, and if it is not, a branch is made to five angle at bubble 1504 and if it is, then a branch is made to three angle at bubble 1502. If the Q six angle status in block 1876 is three, at block 1882 a check is made to see if the frequency is less than 54 Hz. If it is, then a switch is made to five angle quasi six-step at bubble 1504. If not, at block 1884 a check is made see if the frequency is greater than 72 Hz, and if it is, a switch is made to one angle at bubble 1500. If not, a branch is made to three angle at bubble 1502. If the Q six angle status is equal to 5, then at block 1886 a check is made to see if the frequency is less than or equal to 56 Hz, and if it is, the operation will remain in five angle at bubble 1504. If not, at block 1888 a check is made to see if the frequency is less than or equal to 72 Hz, and if it is, then a switch is made to three angle at bubble 1502. If it is not, then a switch is made to one angle at bubble 1500. In the one angle routine at bubble 1500, block 1506 sets the quasi six-step angle status equal to one, block 1508 sets the pointer to the one angle lookup table and then a jump is performed to bubble 1510 which is the Q six 1 table read. The bubble 1502 points to the three angle routine, and at block 1512 the Q six angle status is set equal to 3, at block 1514 the pointer is set to the three angle lookup table and then a jump is made to bubble 1516 which is the Q six 3 table read. The bubble 1504 points to the five angle routine, and at block 1518 the Q six angle status is set equal to 5, at block 1520 the pointer is set to the five angle lookup table and at block 1522 a jump is made to the Q six 5 table read. The bubble 1510 in FIG. 25B, which is the Q six 1 table read, is going to read the one angle table and determine all of the W times from this one angle. The one angle table basically has two symmetrical notches out of each 180 degree pulse, with one notch at each end of a normal 180 degree six-step pulse. The angle of that notch is selected to provide the desired output voltage percentage from 1% to 99%. There is a lookup table value for each of the percentages from 1% to 99% which will then result in the desired output voltage percent for use in quasi six-step operation. For three angle quasi six-step, there are two notches on each end of each 180 degree six-step pulse that are removed and those two notches are selected to provide the desired voltage percentage output and also to do some minimizing of harmonics. The five angle quasi six-step has three notches on each 180 degree six-step pulse or each 180 degree period and those three notches are selected to provide the desired voltage percent with some harmonic minimization.

From the Q six 1 table read bubble 1510, a jump is made to block 1524 to set the offset to the alpha for each table entry equal to the voltage percent times two. The reason for the times two is that each entry is two bytes so in block 1526, alpha one is set equal to the two byte contents of the location pointer plus the offset just calculated, and the pointer was set in block 1508 to the one angle lookup table. At block 1528 W1 is calculated as equal to alpha 1 divided by the inverter frequency times 360 degrees. In block 1530, a check is made to see if W1 is greater than 180 microseconds, and if yes, then that is okay and if not, in block 1532, W1 is set equal to 180 microseconds, because the inverter can fire that short of a pulse. The inverter cannot reliably fire below 150 microseconds so W1 is set to 180 microseconds to make sure this is above 150 microseconds. At block 1534 time sixty is set equal to 60 degrees divided by the inverter frequency times 360 degrees. In block 1536 W6 is set equal to time sixty minus W1. In block 1538 W2, W3, W4 and W5 are all set equal to zero and then we jump to the save Ws bubble 1560. From the Q six 3 table read's bubble 1516 in FIG. 25c, a jump is made to block 1540 where the offset to the alpha 1 is calculated as equal to the voltage percent times the quantity 3 times 2. The 3 is determined by the three alpha entries for every voltage percent and the two is provided because there are two bytes per alpha. In block 1542 alpha 1, alpha 2 and alpha 3 are retrieved from the lookup table by setting alpha 1 equal to the pointer set at block 1514 plus the offset which was just calculated at block 1540, with the brackets indicating the contents of that location are retrieved. The alpha 2 and alpha 3 are the next entries in the table, so they are retrieved by adding two to the pointer plus offset for alpha 2 and adding 4 to the pointer plus offset for alpha 3. At block 1544, the W1 time is calculated as equal to alpha 1 divided by the inverter frequency times 360 degrees. The two intermediate values X2 and X3 are calculated, with X2 equal to alpha 2 divided by the inverter frequency times 360 degrees, and with X3 equal to alpha 3 divided by the the inverter frequency times 360 degrees. Then in block 1546, time sixty, which is the time equivalent of 60 degrees is calculated as equal to 60 degrees divided by the inverter frequency times 360 degrees. In block 1548, a calculation of the rest of the Ws is made, with W6 equal to time sixty minus X3, with W4 and W5 set equal to zero with W3 equal to X3 minus X2 and with W2 equal to X2 minus W1. Since all of the W calculations are done, a jump is made to bubble 1560 which is save Ws. The Q six 5 table read at bubble 1522 in FIG. 25D, comes down to block 1550, where the offset to the alpha one for that voltage percent entry is calculated as equal to the voltage percent times 5 times 2. The 5 indicates there are 5 alphas per voltage percent entry and 2 is provided since each alpha is 2 bytes long. At block 1552 alpha 1, alpha 2, alpha 3, alpha 4 and alpha 5 are retrieved from the lookup table similar to the way it was done for the three angle operation, however, it is necessary to retrieve two more values for alpha 4 and alpha 5. In block 1554, W1 is calculated as equal to alpha 1 divided by the inverter frequency times 360 degrees. Then four intermediate values X2, X3, X4 and X5 are calculated, which are used to calculate the other Ws. At block 1556, time sixty is set equal to 60 degrees divided by the inverter frequency times 360 degrees. At block 1558, a calculation is made for W6 through W2. A jump is made to bubble 1560 to save the Ws, and a return is made from the subroutine.

Figure 26:
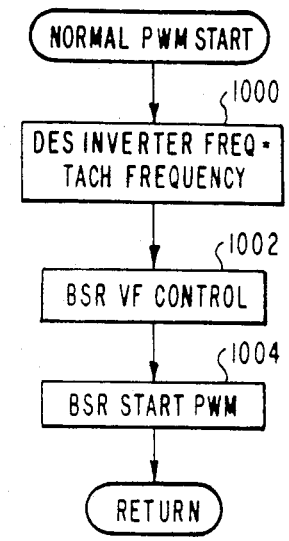
FIG. 26 shows a flow chart of the normal PWM start routine.

In FIG. 26 there is shown the flow chart for the normal PWM start routine, which is called by the check inverter routine shown in FIG. 8 when it is desired to start up the inverter using PWM synthesis operation. In block 1000, the desired inverter frequency is set equal to the tach frequency, since it is desired to start with zero slip. A branch is made in block 1002 to the subroutine V/F control which is disclosed in above-referenced patent application Ser. No. 696,833 to set up the right frequency and voltage. For example, if the frequency is zero here, it is not desired to start with a zero frequency, so the frequency is set to 3/64th of a hertz and the right voltage signal is set to go along with that frequency to provide the constant volts per hertz control. In block 1004, a branch is made to the start PWM routine which is disclosed in FIG. 21 of the above-referenced patent application Ser. No. 698,814 of the synthesis case, and this will start the synthesis timers.

Figure 27:
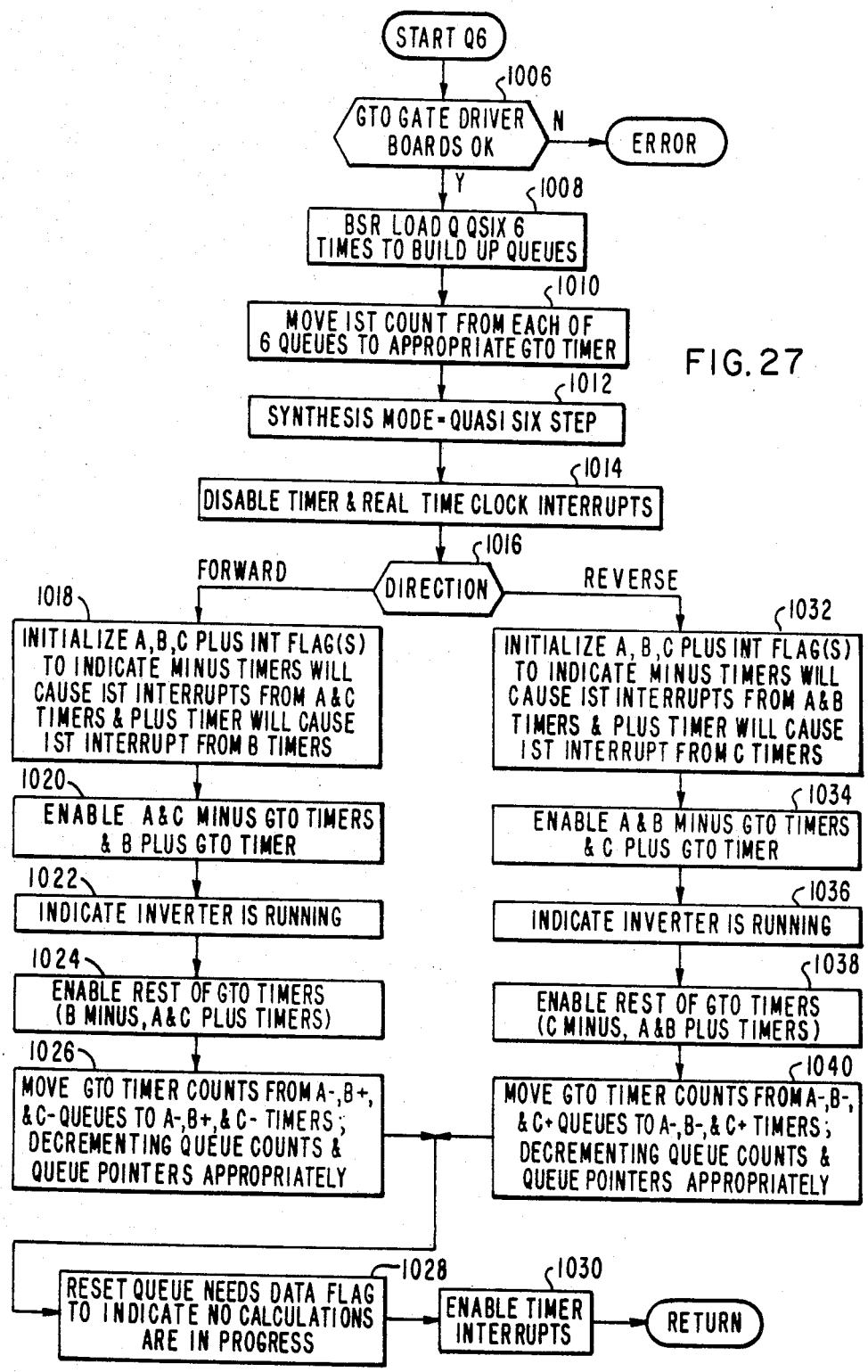
FIG. 27 shows a flow chart of the start quasi six-step routine.

In FIG. 27 there is shown the flow chart for the start Q six routine, which is used whenever starting up the motor when already going at a higher frequency, so that the start should be with the quasi six-step synthesis since the inverter frequency is too high for PWM synthesis operation. At block 1006, a check is made to see if the GTO gate driver boards are okay. If they are not okay, this is an error and a shutdown will result. If they are okay, then at block 1008 a branch is made to the subroutine load Q Qsix six times. This subroutine calculates quasi six-step GTO firing times corresponding to one sixty degree section of quasi six-step, which is disclosed in above-referenced patent application Ser. No. 698,814. Since this subroutine is called six times, 360° worth of quasi six-step GTO firing times will end up being calculated and placed in their respective timer queues in memory. At block 1010 the first count is moved from each of the six timer queues to the appropriate GTO timer. In block 1012, the synthesis mode is declared as being quasi six-step. In block 1014, the timer and the real time clock interrupts are disabled while starting up the synthesis timers. In block 1016, a check is made to see what direction is desired, whether forward or reverse. The difference between forward and reverse is the switch made of the B and the C motor phases. If the direction is forward, block 1018 initializes the A, B, and C plus interrupt flags to indicate that the minus timers will cause the first interrupts for the A and the C timers and the plus timer will cause the first interrupt from the B timers. Each phase has two timers, one being plus and one being minus. At block 1020, the A−, C−, and B+ GTO timers are enabled. In block 1022, an indication is made that the inverter is running. At block 1024, the rest of the GTO timers, the B−, A+, and C+ timers are enabled. All six timers are now running, however, only the three that were started and enabled first are currently counting. In block 1026, the GTO timer counts are moved from the A−, B+ and C− queues to the A−, B+ and C− timers. These are the timers that were started first and are ready to get new counts into their holding buffers. Each timer has one count that is stored besides the count it is counting. In addition, decrementing is done of the queue counts and queue pointers appropriately to indicate that three more counts have been removed. Then at block 1028 the queue needs data flag is reset to indicate no calculations are in progress. The interrupt routines from the timers use this data flag to figure out whether or not they need to calculate data, so that is in the synthesis operation. The timer interrupts are enabled in block 1030 and then a return is made. By the time this return is made, the quasi six-step operation is started and the timers are running accordingly. If the direction is reverse in block 1016, then at block 1032 the A, B and C plus interrupt flags are initialized to indicate that the minus timers will cause the first interrupts from the A and B timers and the plus timer will cause the first interrupt from the C timers. This is similar to the forward direction operation except the B and the C phases are interchanged. At block 1034 the A−, B−, and C+ GTO timers are enabled. At block 1036, an indication is made that the inverter is running. At block 1038, the rest of the GTO timers are enabled, which are the A+, B+, and C− timers. Then in block 1040, the GTO timer counts are moved from the A−, B−, and C+ queues to the A−, B− and C+ timers. These were the three timers that were started up in block 1034, and the queue counts and queue pointers are decremented appropriately.

In FIG. 28, there is shown a chart to illustrate the picking of recovery mode states in relation to the tachometer frequency, where 1 Hz of tachometer frequency equals 30 rpms of the motor. If the frequency is more negative than minus 10 Hz, there is an operational error. If the frequency is between minus 10 and minus 4 Hz, this is the recovery mode minus state and the recovery operation starts out with PWM synthesis. For a frequency between minus 4 Hz and 4 Hz a normal start-up is provided on the assumption the motor is substantially at rest and no recovery procedure is needed. If the frequency is between plus 4 Hz and 70 Hz, then a recovery mode in a low state is provided, and this is going to start out with PWM and may change to quasi six-step depending on the frequency. If the frequency is between 70 Hz and 100 Hz, the recovery mode mid state is provided, and this is going to start out with PWM and will go to quasi six-step and eventually will go to six-step. If the frequency is greater than 100 Hz, the recovery mode high state is provided, and is going to start out with quasi six-step, one angle quasi six-step and then will eventually go to six-step.

Figure 29:
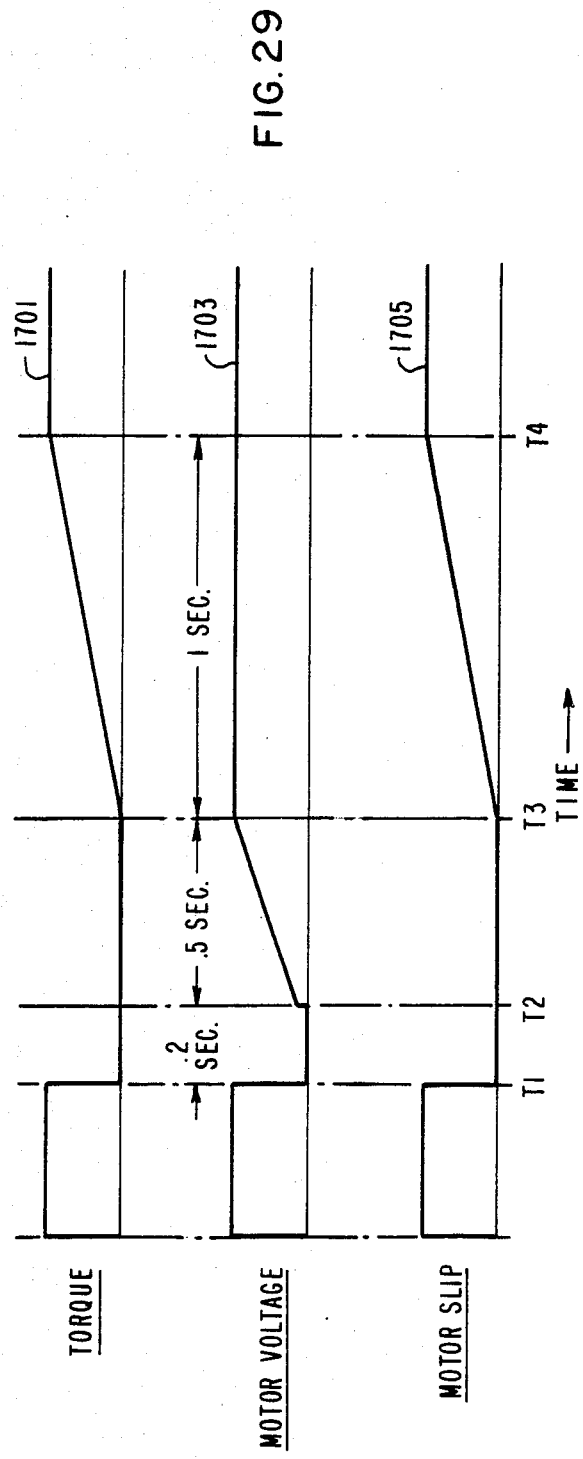
FIG. 29 illustrates the relationships between the output torque, the applied motor voltage and the motor slip for a recovery operation in accordance with the present invention.

FIG. 29 shows the actual start-up during recovery mode in relation to motor torque, the motor voltage and the motor slip. The operation is illustrated for a requested full torque, with full motor voltage and full motor slip to get that full torque. Initially normal operation is shown until time T1 where a shutdown is provided due to a fault condition such as lost line voltage or maybe the voltage went too high. This can be any kind of error shutdown, such as an overcurrent trip or a railgap where the line voltage disappeared. The motor control abruptly shut down at time T1 so torque goes to zero, the motor voltage goes to zero and the motor slip goes to zero. After the 0.2 second recovery timer is over at time T2, the start-up again is provided assuming there is a request from the car control to start. The motor voltage immediately jumps to 10% as determined by the recovery percent, on the assumption that the car did not slow down appreciably so it is desired to obtain about the same motor voltage. That is, the motor voltage provided in order to get the motor torque that was requested. This voltage depends on the motor frequency, and is the required voltage to maintain a desired constant volts per hertz relationship. The motor voltage at line T2 jumps up to 10% of the required value and then ramps up in about one-half second to a 100% recovery percent. And the slope of the motor voltage ramp line is equal to 180% per second for passenger comfort. Once the 100% voltage is provided at time T3 the desired motor voltage is provided and a switch is made from recovery state to one of the other normal operating states shown in FIG. 3. At time T3 the torque starts to ramp up and since the torque is obtained by changing the slip of the motor, the change in slip and the change in torque go up together. The slope of the torque ramp is 800 lb. feet per second, to ensure that the passengers do not get jerked around inside the car.

The shutdown routine in FIG. 4 operates to disable the synthesis hardware and initialize. A recovery time is set equal to 0.2 seconds, and the control state is set equal to emergency off. The restart routine in FIG. 5 reinitializes the variables associated with the synthesis and enables all interrupts and then a jump is made to car control go which is in FIG. 6. The start routine shown in FIG. 6 ends up coming down to perform the background monitor. When an interrupt occurs, the interrupt routine shown in FIG. 7A disables the real time interrupt, reads the line voltage, communicates with the car control logic and increments the real time counter at a 720 Hz rate. The blocks that follow block 260 are done at a 240 Hz rate, so every third interrupt executes the control functions at a 240 Hz rate to update the timers, including the recovery timer in FIG. 7B. These are software timers and one of the timers is the recovery timer that was initialized at 0.2 seconds. So every 240th of a second when this routine is executed, a 240th of a second is subtracted from that timer until it times out. This provides a delay for the currents to die-out in the motors and for the flux to disappear so the control operation can start over again. The tachometer frequency is read. The car communication data is processed which tells whether the car control computer is allowing a recovery procedure to occur. Assuming everything is all right it will permit a recovery operation. A branch is made to a subroutine called Check Inverter. A determination is made to see if the inverter run flag is true, and this indicates if the inverter is running for shutdown, the inverter is not going to be running. If the inverter run flag is not true, this indicates no desire to start up again and a real time exit is made. If the inverter run flag is true, a branch is made to the subroutine control loop in FIG. 15, which does the control operations.

The check inverter subroutine in FIG. 8 checks to see if the inverter is running. If the inverter presently is running at block 304, the inverter test routine in FIG. 13 makes sure the line voltage is within the desired range. If the inverter is not running, which would be the case for a shutdown, a check is made at block 310 to see if the last shutdown is an emergency one. If the inverter is not running, the state should be emergency off if there was an emergency shutdown or normal off if the operation came to a stop. If the state is emergency off, a branch is made to a mode called emergency off shown in FIG. 11.

FIG. 11, determines if the recovery timer is timed out which is the 0.2 second timer, and if not, a return is made. If the timer is timed out, a determination is made to see if the car control has permitted a recovery and if not a return is made. If yes, then the control state is set equal to normal off.

As shown in the bubble diagram of FIG. 4, the operation is in the emergency off state because of an emergency shutdown. If everything is alright, a jump is made to normal off which means the motor operation can start up. If the recovery timer is timed out, and the car control has requested recovery, the operation is allowed to change the control state to normal off. The next time through the check inverter routine in FIG. 8, when checking the control state at block 310, the operation is in the normal off control state, and a check is made of the tachometer frequency at block 318 to see if it is less than zero hertz and if yes then a branch is made to the negative tach test. If not zero at block 318, this means that the vehicle is either stopped or is rolling forward and not going backwards. Then at block 320 a check is made to see if the absolute value of the tachometer frequency is greater than 4 Hz. If it is greater than 4 Hz, a positive tach recovery procedure is initiated because the voltage that is required across the motor is great enough to possibly cause some transients and overcurrent and subsequently another shutdown. If it is not greater than 4 Hz at block 320, then a normal start-up is provided. A branch is made to inverter test at block 322, to make sure the line voltage is within desired limits and the control state is set to power below six-step at block 324. As shown in FIG. 4 here, the state went from normal off to the power below six-step. Then a branch is made to the normal PWM Start at block 326, which will start with PWM synthesis, and to check exit. The motor control is now operating normally. The check inverter subroutine shown in FIG. 8 will start the synthesis. If the answer is yes at block 320, then a jump is made to the positive tach recovery routine shown in FIG. 10. If the tachometer frequency is less than 5 Hz at block 370 and the tractive effort request is not greater than zero at block 372, then there is no need for a start-up because the motor controller wants to slow down and the vehicle is already down to 5 Hz, so the friction brakes can do what is wanted. If you have tractive effort request greater than zero at block 372 and/or the tachometer frequency is greater than 5 Hz at block 370, then the inverter is started and a branch is made to the inverter test to check the line voltage, the control state is set equal to recovery and a branch is made to the railgap recovery subroutine. In relation to FIG. 3, the operation has gone from normal off state to the recovery state, and eventually will get out of recovery and either go into power open loop or power six-step. The inverter is running because the railgap recovery subroutine in block 378 would start the inverter.

In FIG. 8 block 318, the tachometer frequency is less than zero if a branch is made to negative tach test in FIG. 9. The vehicle is rolling backwards, and a check of the tractive effort request is made to see if it is greater than zero, otherwise the brakes are used to slow the vehicle. At block 352 a check is made to see if the tachometer frequency is less than minus 10 Hz, which could indicate the tachometers are not working, so an error shutdown is provided. If not greater than minus 10 Hz, then at block 354 a check is made of the absolute value of the tach to see if it is greater than 4 Hz. If it is greater than 4 Hz, then the recovery procedure is provided. If not, the control state is set equal to power open loop and that's another arrow on the FIG. 9. So if the vehicle is rolling backward, the state will be recovery or power open loop. A branch is made to normal PWM start at block 360 and an exit is made. The next time through the real time interrupt shown in FIGS. 7A and 7B, the inverter will be running.

Once the inverter is running, if the absolute value of the the tachometer frequency is 4 Hz, either minus or plus the railgap recovery routine shown in FIG. 14 is followed. First of all a check is made to be sure the tachometer is within reason between 3/64th of a hertz and 200 Hz, and if not something is wrong and a shutdown is provided. If it is, then at block 402 the requested inverter frequency is set equal to the tachometer frequency, so this would provide motor operation at zero slip, with no torque, to minimize the current transients. In block 404, the frequency is set equal to the requested inverter frequency, then a branch is made to the subroutine calculate voltage, which is going to calculate the voltage associated with that frequency to give desired constant volts per hertz operation. The recovery percent is set equal to 10%, so the recovery voltage first put across the motor is going to be 10% of the voltage calculated in block 406 to avoid starting at full voltage that might cause a current transient. At block 410 the requested inverter voltage is set equal to the calculated requested inverter voltage times the recovery percent voltage that is, what is returned from the subroutine. So the voltage calculated in the subroutine of block 406 is reduced to only 10% of the value returned from that subroutine. The new voltage flag is set equal to true to tell the synthesis that a new voltage is provided so it can do some extra calculations. In block 414, a check is made of the requested inverter frequency, and if the frequency is less than zero hertz, the recovery control state is set equal to the recovery mode minus state. If the frequency is less than or equal to 70 Hz and greater than zero hertz, then the recovery control state is set equal to recovery mode low state. If it is between 70 and 100 Hz, then the recovery control state is set equal to recovery mode mid state and if it is greater than 100 Hz, then it is to the recovery mode high state. In each of the first three cases, a branch is made to start off with PWM synthesis, but in the last case if the frequency is greater than 100 Hz, the start is with a 1 angle type quasi six-step because the switching frequencies would be too high with PWM so quasi six-step starting is used above 100 Hz. So, a return is made to the operation previous to the call by the real time interrupt routine.

Another subroutine called by block 280 of FIG. 7B for the real time interrupt routine, is the control loop shown in FIG. 15. Once the inverter is started, this control loop routine is executed. The first thing done in the control loop routine is to determine the operating mode, and a branch is made to a subroutine shown in FIG. 16. The determine mode subroutine shown in FIG. 16 checks to see if there is a desire to change modes. At block 444, of FIG. 15 if the control state does not equal recovery, a branch is made to the TER jerk limit routine, which ramps up the torque of the motor to the desired torque at a rate comfortable for the passengers. Since it is desired to hold the torque at zero because the operation is at zero slip during the recovery procedure, a bypass is made of the routine at block 446 to keep the tractive effort request equal to zero. At block 448 the routine calculates the torque feedback. At block 454 a check is made of the control state to see if it is equal to recovery and if it is, there is no need to calculate the voltage at block 456 which is associated with the frequency that was calculated in block 452. The VF control is provided for special conditions where it is not desired to apply the full rated volts across the motor.

The determine mode routine shown in FIG. 16 determines the control state mode. The one of interest here is the recovery branch, which is shown in FIG. 17 in an effort to determine if the control state should go to one of the other three bubbles shown in FIG. 3. If in FIG. 17 the recovery control state does not equal none at block 470, the routine exits. If it is equal to none, the control state is going to change to one of the other three bubbles in FIG. 3. In the recovery mode, the voltage was ramped up so that the operation is up to full voltage and the recovery control state has been set equal to none. The recovery operation has the car moving, and it is proper to change control state to one of these other three states, power open loop, power below six-step or power six-step, and that jump is made depending on the tachometer frequency. If the tachometer frequency is less than zero hertz, the car is in a rollback situation so the jump is to a control state equal to power open loop. If the tachometer frequency is greater than or equal to zero hertz, a check is made to see what the synthesis mode is and then whether the synthesis mode presently is six-step or quasi six-step. If it is six-step, the control step is set equal to power six-step and if it is not six-step then it is going to be set to equal to power below six-step. The recovery procedure at this point is now done, but there is no torque across the motor so the next time through the control loop routine the control state is no longer recovery and the torque will jerk limit up to full torque and actually that is when the full recovery procedure is done although the operation will not be in recovery state since the normal operation is used to do that. The control loop routine of FIG. 23A calls the control state control routine at block 452 as shown in FIG. 18.

FIG. 18 is checking the control state, and the one of interest here is the recovery branch F708, shown in FIG. 19. The recovery branch routine calls the subroutine called recovery control, shown in FIG. 21. The desired inverter frequency is set equal to tach frequency, because the operation is holding zero slip. The calc subroutine will calculate the desired voltage across the motor such that you get constant volts per hertz. Block 1098 increments the recovery percent by 0.75%. It started out at 10% so the first time through it is going to equal 10.75%, and this will ramp up to 100% and then the recovery percent is clamped equal to 100%. The requested inverter voltage is set equal to the recovery percent times the value returned by the calc voltage routine to provide a desired percentage of voltage. The requested voltage percent, which is associated with the requested inverted voltage, is calculated. The new voltage flag is set equal to true and then a return is made. The synthesis is started with a routine called start PWM or a routine called start quasi six-step depending on the recovery control state that is selected. If the tach frequency is above 100 Hz, the start quasi six-step routine is used and if it is below 100 Hz, the start PWM routine is used. This is explained in above referenced patent application Ser. No. 696,814. Once the operation is running in PWM, when the timer has need for more time calculations, then the load Q PWM routine is called during the synthesis operation as explained before. At block 1762 of FIG. 23A a check is made of the recovery state to set up one of five states. This is going to be one of the four states initially set up during the railgap recovery routine shown in FIG. 14 or none. So if it is none, a jump is made to block 1764 to see if the frequency is greater than 35 Hz, and if it is a change is made to quasi six-step. If it is not, a check is made at block 1766 to see if the voltage percent is greater than 65%. This is not the recovery percent, but is the percentage of six-step voltage provided by the inverter. If the voltage is not greater than 65% and the frequency is not greater than 35 Hz, the operation will stay in PWM and a branch is made to no change. If it is, then a check is made at block 1768 to see if the frequency is greater than 15 Hz, and if it is not greater than 15 Hz, then an error is present because for a real low frequency the voltage percent is up high. If the frequency is greater than 15 Hz and the voltage percent is greater than 65%, a branch is made to quasi six-step. If the operation is in recovery and the vehicle is rolling backwards, this would be the minus recovery state, then a branch is made to block 2602 to see if our recovery percent is greater than or equal to 100%. Once the recovery percent is equal to 100%, that marks the end of the recovery state and so therefore if it is greater than 100% set the recovery state equal to none at block 2604 and the operation ends up staying in PWM. For the low recovery state, when a tachometer frequency is between 0 and 70 Hz, a check is made to see if the voltage percent is greater than 45% and if it is the operation is going to switch to quasi six-step. If not, a check is made to see if the recovery percent is equal to 100% yet and if it a change of the state is made to none. If not the operation will stay in PWM. Another state is the mid recovery state, and a check is made to see if the voltage percent is greater than 50%. If it is, then a switch is made to quasi six-step. If not, a check is made to see if the recovery percent is greater than or equal to 100% and if it is, then a change of the state is made to none and if not, the state remains in PWM. If the recovery state equals high and the operation is in PWM, there is a problem because the frequency is above 100 Hz and the operation should not be in PWM, so that would be a software error.

Figure 24A:
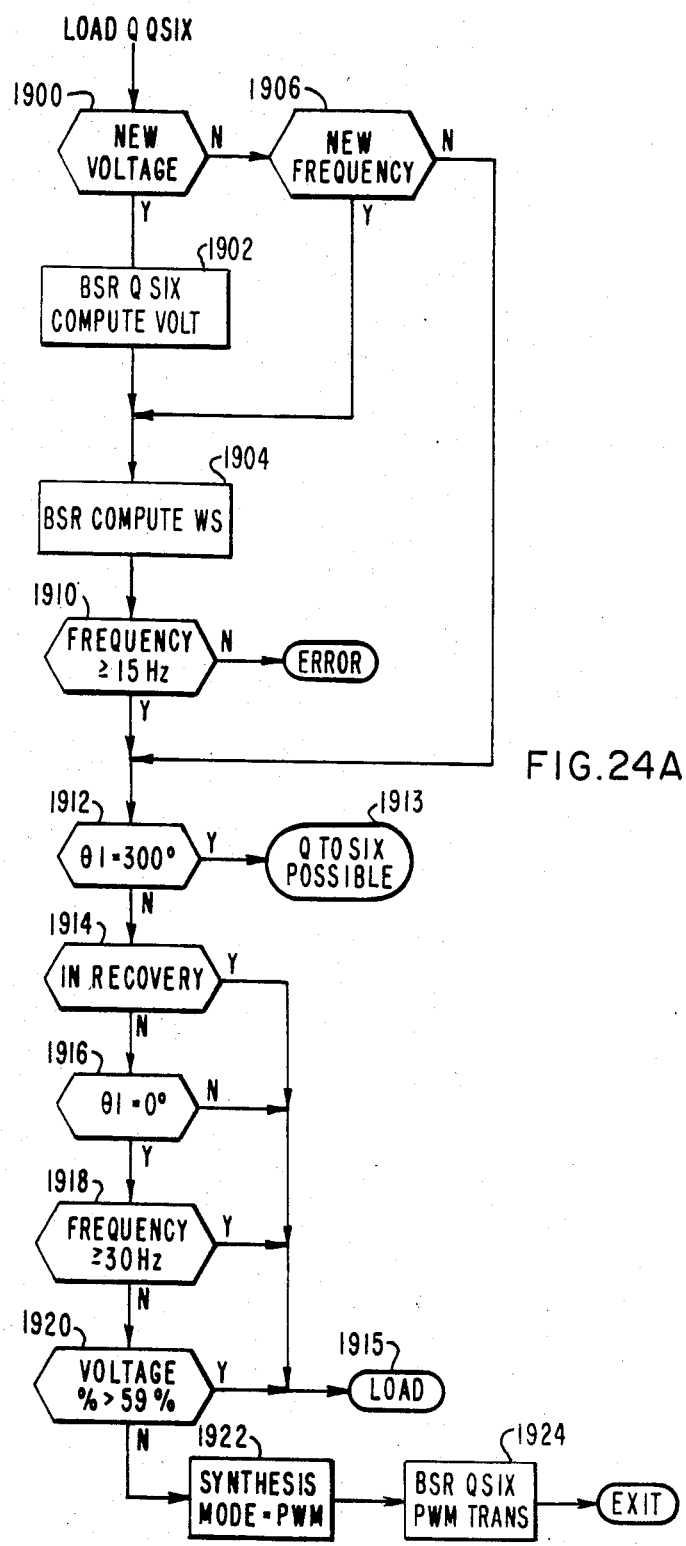
FIGS. 24A, B, C, D, E show a flow chart of the load Q in quasi six-step mode routine.
Figure 24B:
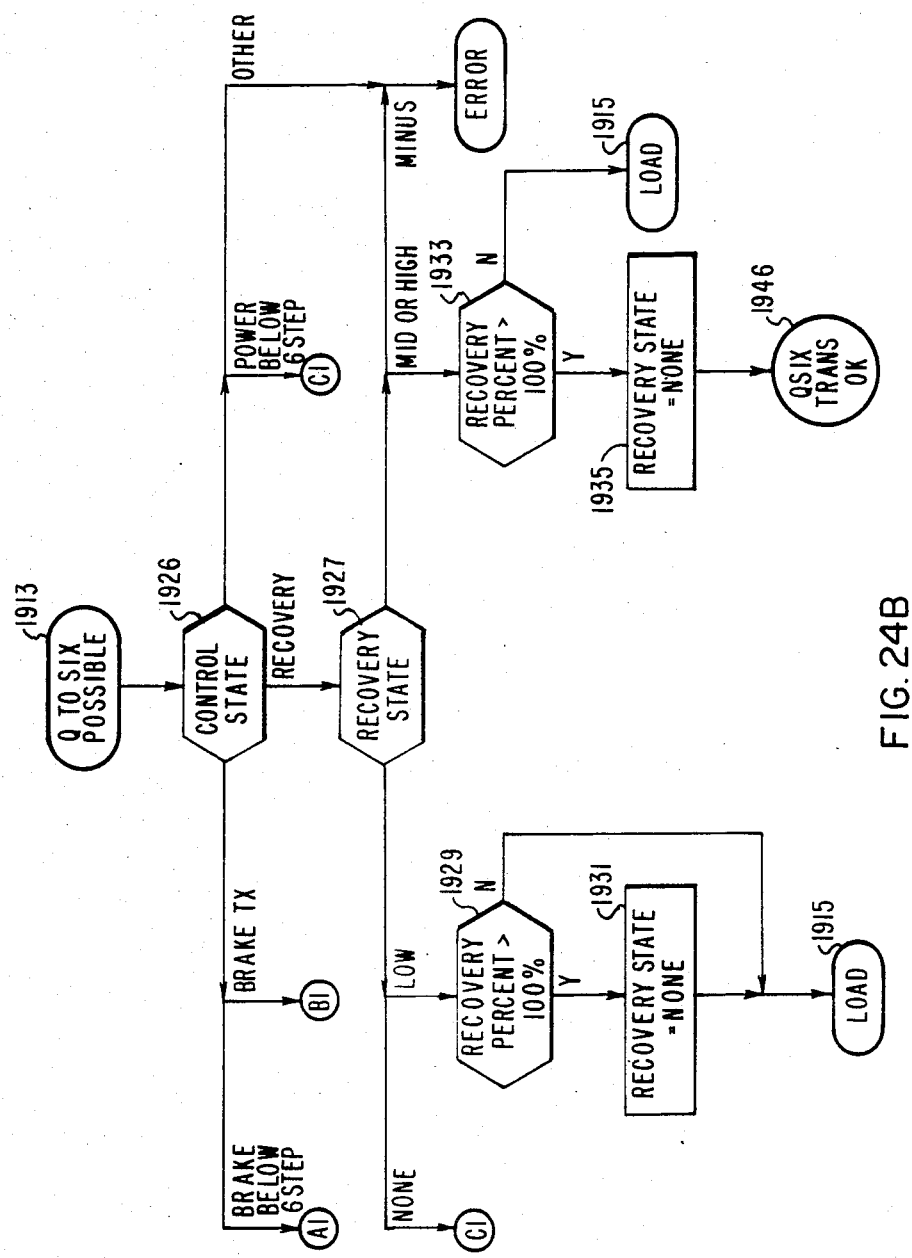
Figure 24C:
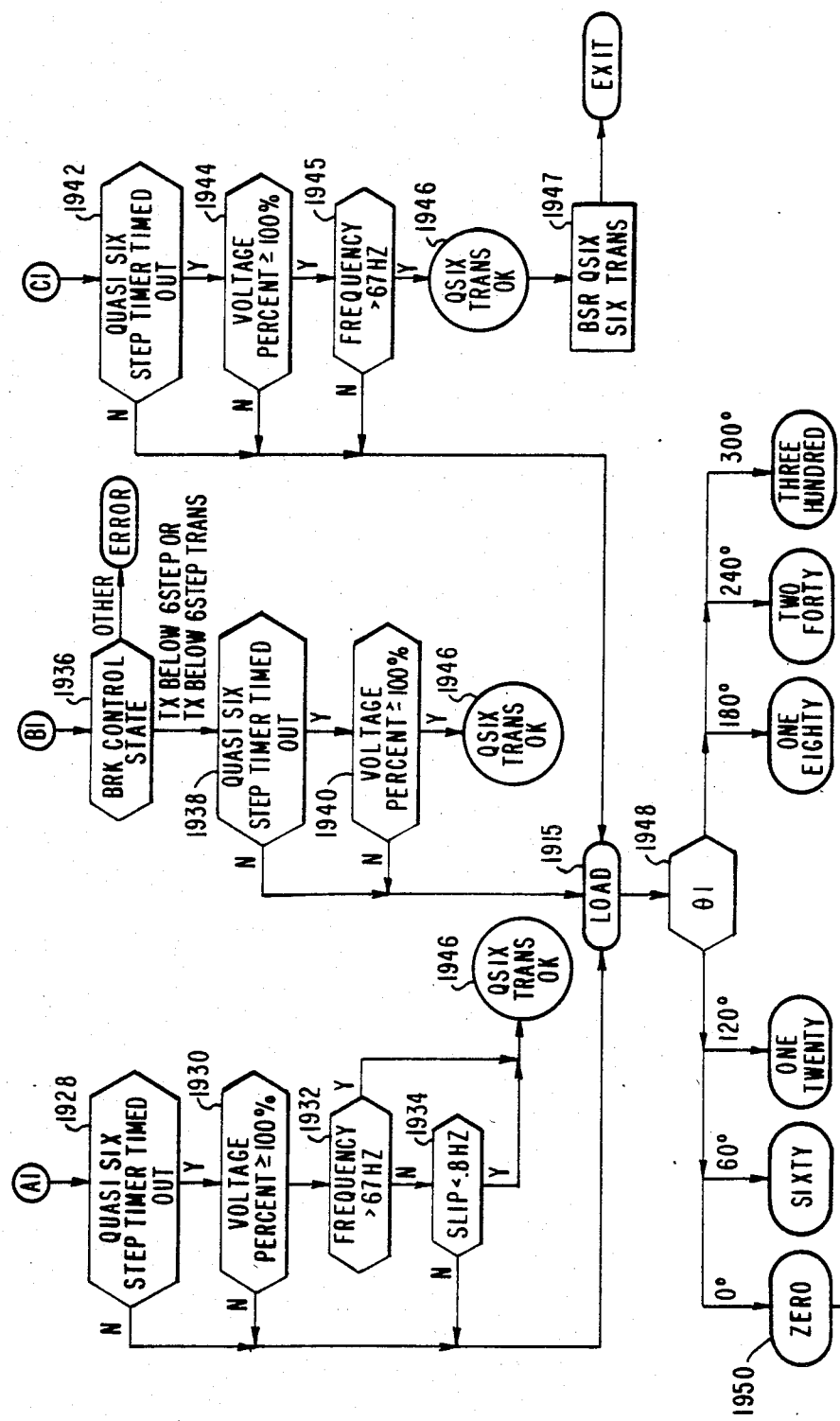
Figure 24D:
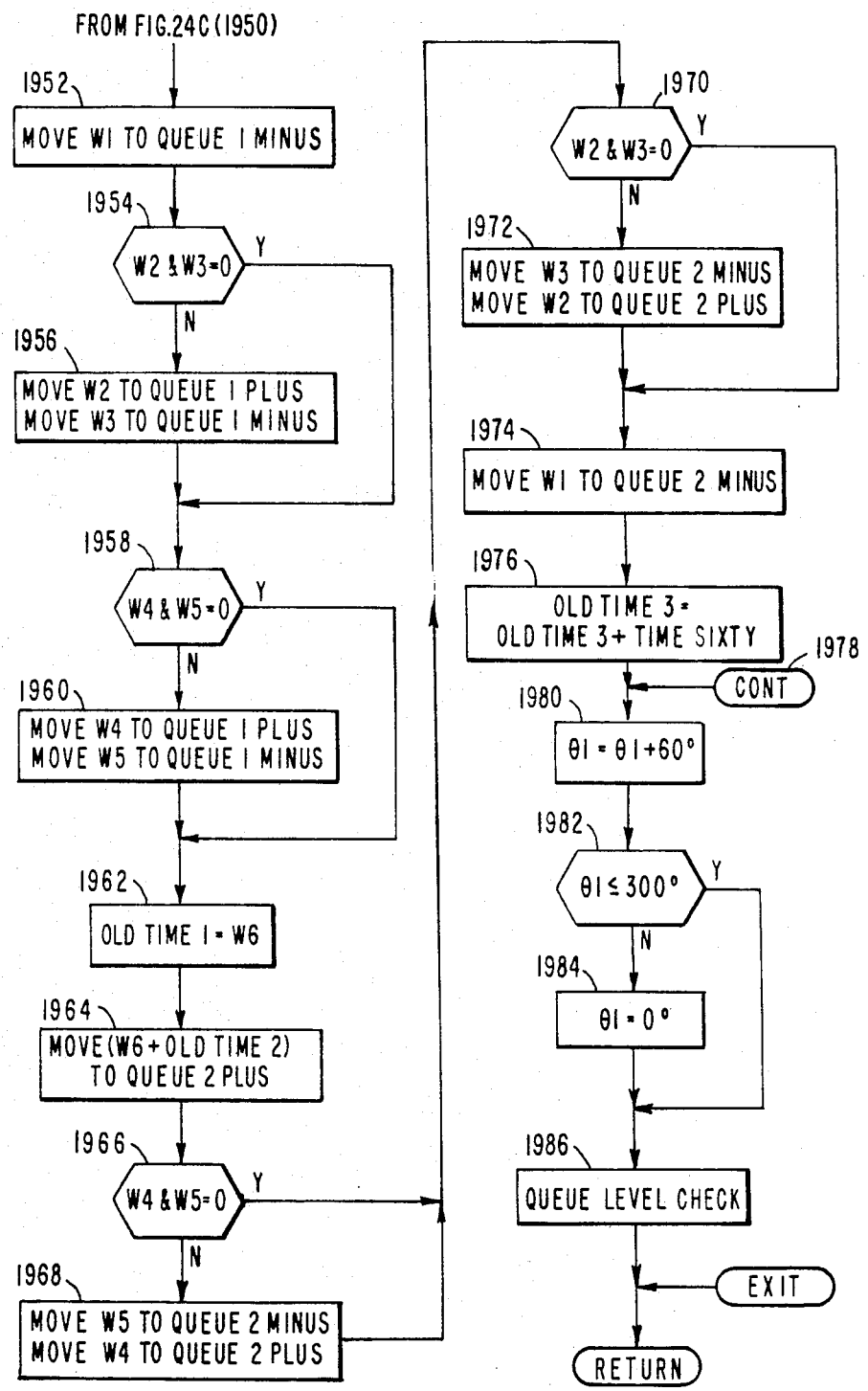
Figure 24E:
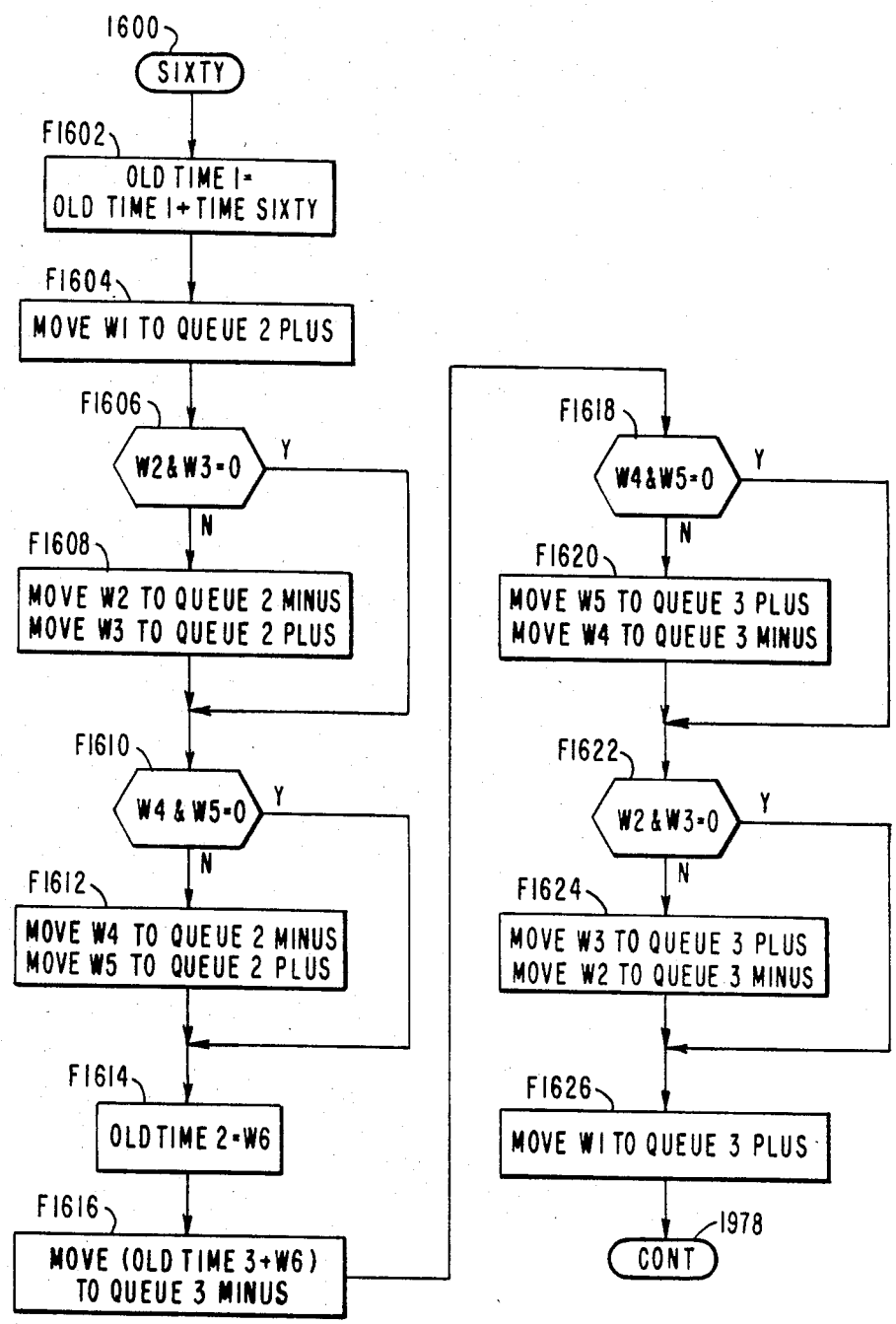
Figure 25A:
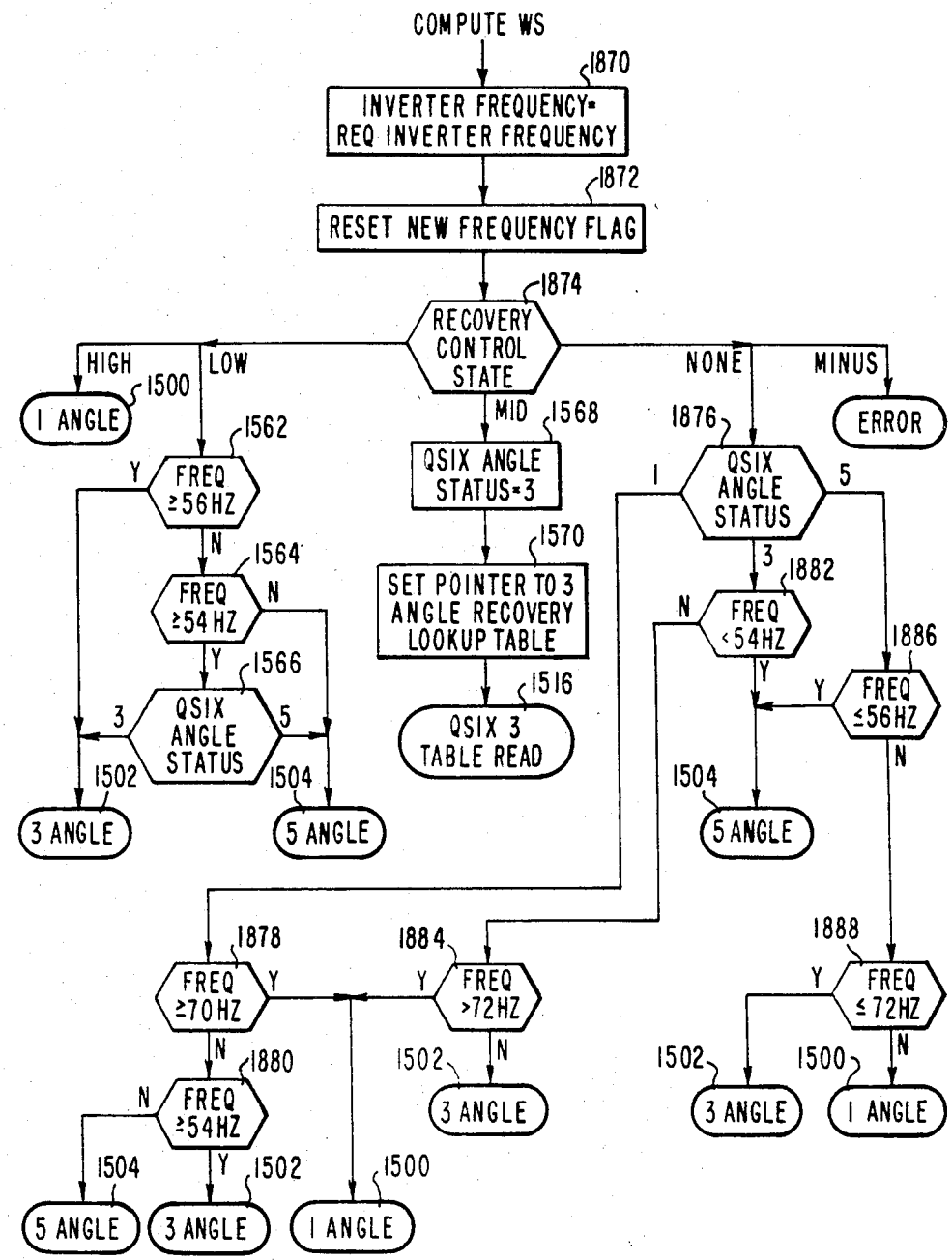
FIGS. 25A, B, C, D show a flow chart of the compute W times routine.
Figure 25B:
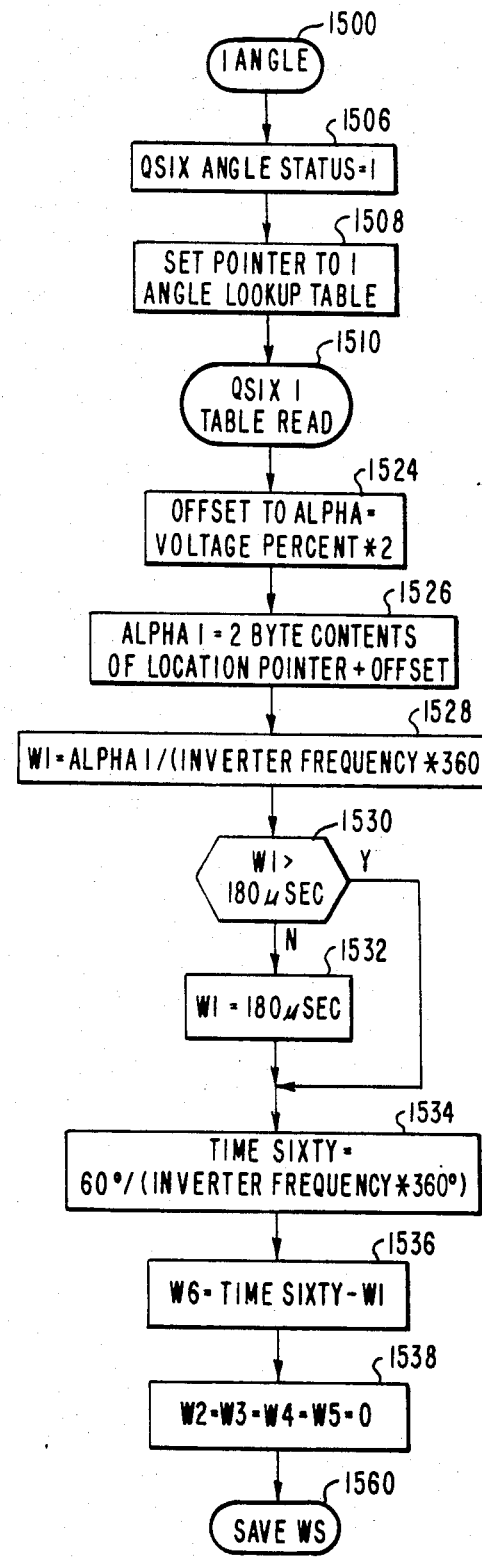
Figure 25C:
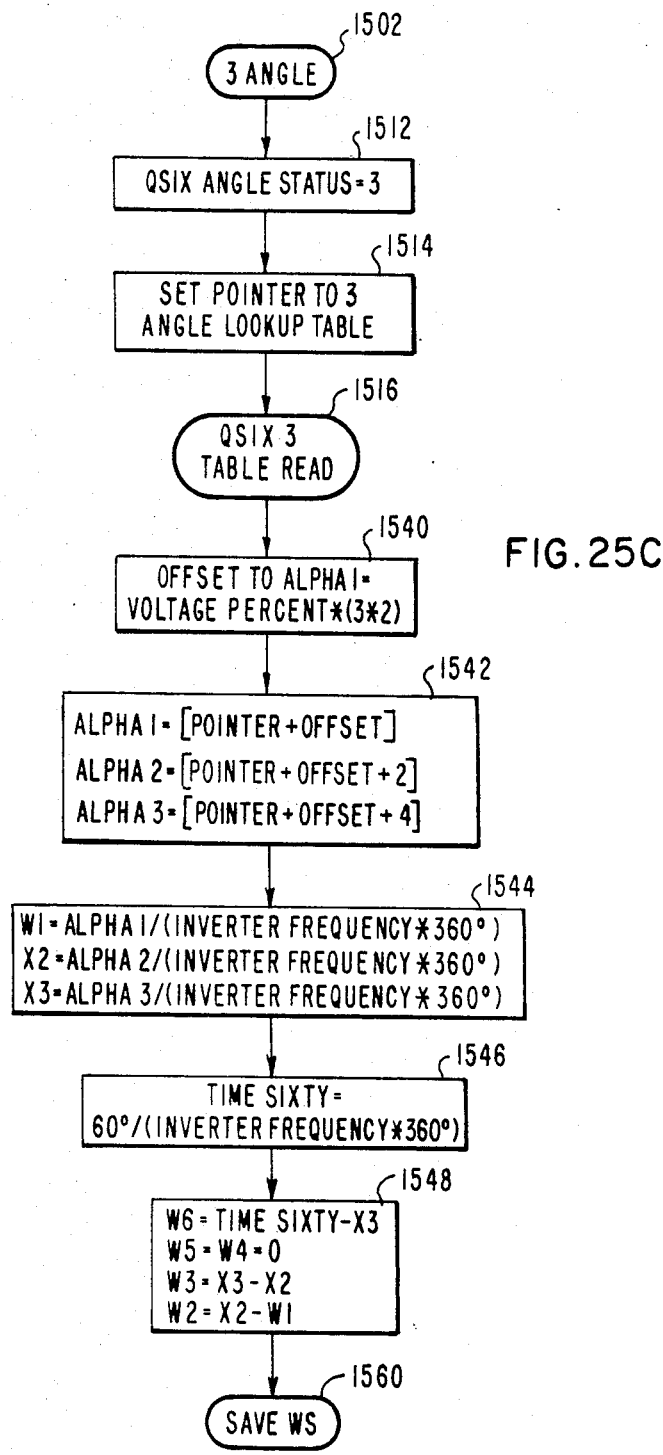
Figure 25D:
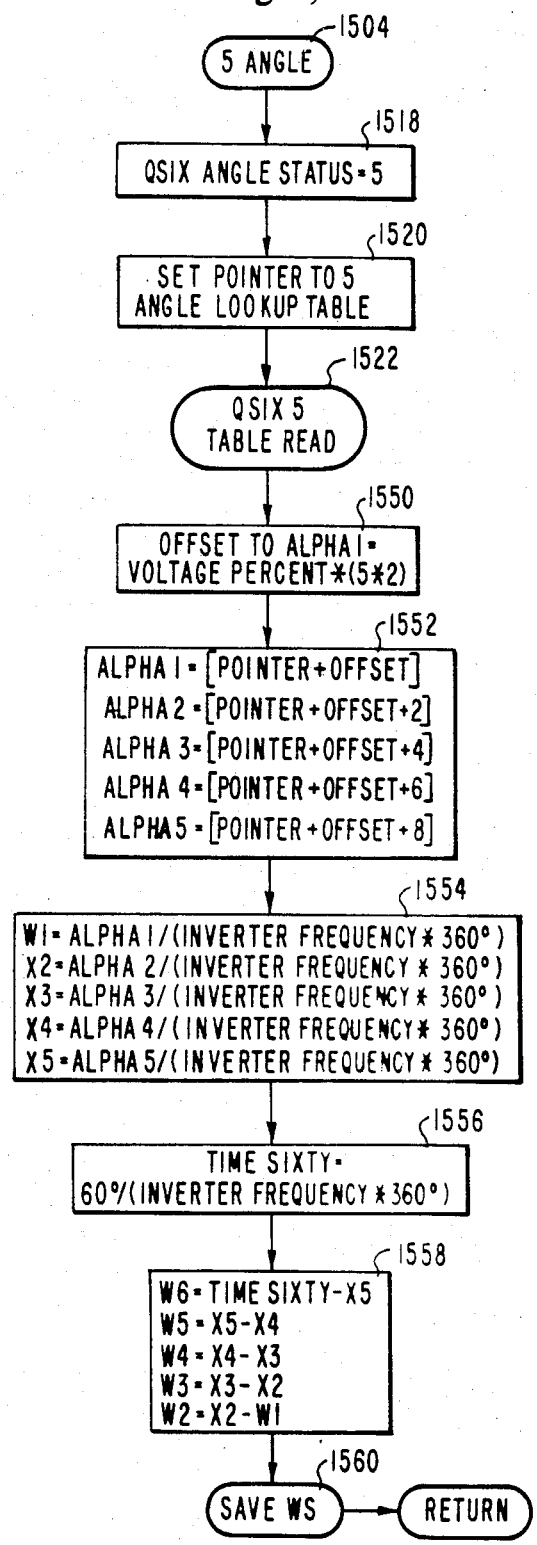

In FIG. 26 there is shown the normal PWM start routine that calls the start PWM routine if a recovery is not done, a branch is made to normal PWM start. If a recovery is done, a branch is made to PWM start. The normal PWM start does a few extra things like calculating the voltage needed and then applies the full voltage. The reason to start with quasi six-step in the recovery is because to start with quasi six-step the frequency has to be above 100 Hz and a recovery is needed. There is not provided a normal start quasi six-step, just the start Q six routine shown in FIG. 27. The start Q six routine is going to start the timers in quasi six-step, and the operation is recovering either by starting the quasi six-step operation in the recovery state high or to arrive there through the start-up in PWM then in the load Q PWM routine which is shown in FIGS. 23A to 23C a decision was made to change to quasi six-step. During the synthesis operation interrupts from the timers will be provided to require calculating quasi six-step routines, which is load Q Q6 shown in FIGS. 24A to 24E. In FIG. 24B at block 1926 a check is made of the control state and if the operation is in recovery, then at block 1927 a check is made of the recovery state. If the operation is in the none recovery state, it is waiting for the delay for the control to switch to another state. A branch is made to C1 which is to remain in quasi six-step. If the voltage is up to 100%, it may be desired to change from quasi six-step to six-step, so the checks at blocks 1942, 1944 and 1945 of FIG. 24C are made to see if a transition to six-step is desired, and if so a switch to six-step is made and if not the operation will stay in quasi six-step. If the operation is equal to minus, that is an error because the vehicle should never be rolling back in a quasi six-step because it can only roll back up to 10 Hz and quasi six-step does not take effect until several hertz higher than that so that most likely would be a software error. If the recovery state is equal to low, a check is made in 1929 to see if the recovery percent is 100% and if it is the recovery state is not equal to none, and otherwise the operation will stay in quasi six-step because low is 0 to 70 Hz where it can stay in quasi six-step. If the recovery state is mid or high, it is above 70 Hz and a check is made to see if the recovery percent is greater than 100%. If it is not, the operation will stay in quasi six-step. If it is the recovery state is set equal to none and a change is made to six-step. FIGS. 25A to 25D compute W times and in block 1874 a check is made of the recovery control state. If it is none either the operation is not in recovery or is in recovery but the voltage percent is up to 100%, and a check is made at block 1876 to determine what tables to use. If the recovery state is minus, there is an error. If the recovery state is low, then a check is made in relation to the frequency to either pick a three angle quasi six-step table or the five angle quasi six-step table. If the recovery state is mid, which means the operation is between 70 and 100 Hz, then the quasi six-step angle status is set equal to three angle and the pointer is set to the three angle recovery lookup table which is a little bit different than the three angle lookup table in that it has bigger angles so that the operation is at a higher frequency and the on times for the GTOs have to be longer or the angles have to be bigger to get the same amount of minimum on time. A branch is made to a three angle table reading. If the operation is in the high state, a branch is made to use one angle quasi six-step.

We claim:

1. In apparatus for controlling an induction motor in response to an operation request signal, with said motor adapted to be energized from an inverter coupled to a DC power source having a voltage and, after the inverter has been shut down with the motor rotating, the combination of first means coupled with the motor to provide a motor speed signal, second means responsive to the motor speed signal for providing a desired inverter frequency signal in relation to said motor speed signal, third means predetermining a desired inverter voltage in response to the motor speed signal, fourth means determining a predetermined percent of said desired inverter voltage for providing an initializing recovery voltage to said motor, and fifth means coupled with the fourth means for providing a predetermined incremental ramp increase from the initializing recovery motor voltage provided for said motor to increase the value thereof to the desired motor voltage.

2. In apparatus for controlling an induction motor in response to an operation request signal, with said motor adapted to be energized from an inverter coupled to a DC power source having a voltage and, after the inverter has been shut down with the motor rotating, the combination of first means coupled with the motor to provide a motor speed signal, second means responsive to the motor speed signal for providing a desired inverter frequency signal in relation to said motor speed signal, third means determining a desired inverter voltage in response to the motor speed signal, fourth means determining a predetermined percent of said desired inverter voltage for providing voltage to said motor, fifth means coupled with the fourth means for providing a predetermined ramp increase of the motor voltage provided for said motor, and means responsive to said motor voltage for providing a recovery start-up of the inverter when said motor voltage goes to substantially zero and the operation request signal is requesting a motor torque.

3. The apparatus of claim 2, with the fourth means providing the initializing recovery voltage to said motor having a substantially constant volts per hertz relationship to said motor speed signal.

4. The motor control apparatus of claim 1, including sixth means responsive to the motor voltage for controlling the motor slip to provide a desired torque in accordance with said operation request signal.

5. The motor control apparatus of claim 1, including sixth means responsive to the motor voltage for controlling the motor slip in response to said operation request signal.

6. The motor control apparatus of claim 1, with the fifth means increasing the motor voltage to a requested motor voltage in accordance with a rated air gap flux density.

7. The method of controlling an induction motor in response to an operation request signal, with said motor adapted to be energized by a voltage supplied by an inverter with said inverter being connected to a DC power source, after the inverter is shut down by a fault condition with the motor rotating, the method comprising the steps of sensing that the rotating frequency of the motor is greater than a first frequency, providing an initializing energization voltage to said motor in accordance with a predetermined percentage of the required motor voltage to satisfy the operation request signal, and increasing the energization voltage from the initializing energization voltage to ramp up the energization voltage to said requested motor voltage.

8. The motor control method of claim 7, including the step of controlling the slip of said motor to increase the motor torque in response to the operation request signal.

9. The motor control method of claim 8, including the step of providing an initial time delay period for the energization of the motor after said shut down and before the initializing energization voltage is provided to said motor.

10. The motor control method of claim 8, with the initializing energization voltage being provided to the motor after said initial time delay period, and with the ramp up of the energization voltage being provided in a second time delay period.

11. The motor control method of claim 8, including the step of controlling the motor slip to determine the output torque supplied by the motor after the ramp up of the energization voltage to said requested voltage.

12. The motor control method of claim 8, with the ramp up of the energization voltage to said requested voltage being provided after an initial time delay period following said shutdown, and controlling the motor slip to increase the torque supplied by the motor after said requested motor voltage is provided.

13. The method of controlling an induction motor in response to an operation request signal, with said motor adapted to be energized by a voltage supplied by an inverter with said inverter being connected to a DC power source, after the inverter is shut down by a fault condition with the motor rotating, the method comprising the steps of sensing that the rotating frequency of the motor is greater than a first frequency, providing an energization voltage to said motor in accordance with a predetermined percentage of the required motor voltage to satisfy the operation request signal, increasing the energization voltage to ramp up the energization voltage to said requested motor voltage, controlling the slip of said motor to increase the motor torque in response to the operation request signal, and providing an initial time delay period for the energization of the motor after said shut down and before the energization voltage is provided to said motor.

* * * * *